US009395909B2

(12) United States Patent
Asakura

(10) Patent No.: US 9,395,909 B2
(45) Date of Patent: Jul. 19, 2016

(54) SCROLL CONTROL DEVICE, TERMINAL DEVICE, AND SCROLL CONTROL METHOD

(75) Inventor: You Asakura, Tokyo (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 344 days.

(21) Appl. No.: 13/609,589

(22) Filed: Sep. 11, 2012

(65) Prior Publication Data
US 2013/0106744 A1 May 2, 2013

(30) Foreign Application Priority Data

Oct. 26, 2011 (JP) .................................. 2011-235341

(51) Int. Cl.
*G06F 3/0488* (2013.01)
*G06F 3/0485* (2013.01)

(52) U.S. Cl.
CPC .......... *G06F 3/04883* (2013.01); *G06F 3/0485* (2013.01)

(58) Field of Classification Search
CPC .......... G06F 1/626; G06F 3/01; G06F 3/044; G06F 1/1684; G06F 1/169; G06F 3/03547; G06F 3/0482; G06F 3/0485; G06F 3/0238; G06F 3/0481; G06F 17/30265; G06F 17/3028; G06F 3/011; G06F 3/04847; G06F 1/26; G06F 1/28; G06F 3/017; G06F 3/0202; G06F 3/03; G06F 3/0346; G06F 3/03543; G06F 3/0362; G06F 17/30047; G06F 17/3005; G06F 17/30058; G06F 17/30277; G06F 17/30734; G06F 17/30893; G06F 1/3287; G06F 2009/45579; G06F 2200/1614; G06F 2203/0333; G06F 2203/04806; G06F 3/012; G06F 3/016; G06F 3/0317; G06F 3/038; G06F 3/045; G06F 3/046; G06F 3/048; G06F 3/04815
USPC .................................................. 345/173–183
See application file for complete search history.

(56) References Cited

U.S. PATENT DOCUMENTS 9,086,756 B2 * 7/2015 Schon .................... G06F 3/0416
2006/0048071 A1 * 3/2006 Jarrett et al. .................. 715/784
(Continued)

FOREIGN PATENT DOCUMENTS

CN       102221966 A    10/2011
EP        2112584 A1    10/2009
(Continued)

OTHER PUBLICATIONS

European Search Report for corresponding EP Application No. EP12189323.4, dated Aug. 14, 2013.
(Continued)

*Primary Examiner* — Kenneth B Lee, Jr.
(74) *Attorney, Agent, or Firm* — Matthew B. Dernier, Esq.

(57) ABSTRACT

When a horizontal-coordinate value or a vertical-coordinate value of a current touch point with reference to a point of origin defined at a touch-start point at which a drag operation on a touch screen starts is less than a threshold value, an X-direction movement amount reset unit or a Y-direction movement amount reset unit resets an amount of horizontal movement or an amount of vertical movement in the drag operation to zero. A scroll control unit scrolls the screen in accordance with the amount of horizontal movement and the amount of vertical movement as processed by the X-direction movement amount reset unit and the Y-direction movement amount reset unit.

20 Claims, 32 Drawing Sheets

(56) References Cited

U.S. PATENT DOCUMENTS

| | | |
|---|---|---|
| 2008/0165161 A1 | 7/2008 | Platzer |
| 2009/0262089 A1 | 10/2009 | Wang |
| 2010/0188344 A1 | 7/2010 | Shirakawa |
| 2011/0047504 A1 | 2/2011 | Wienands |
| 2011/0185321 A1 | 7/2011 | Capela |

FOREIGN PATENT DOCUMENTS

| | | |
|---|---|---|
| JP | 2010026064 A | 2/2010 |
| JP | 2010170479 A | 8/2010 |
| TW | 200945100 A | 11/2009 |

OTHER PUBLICATIONS

Office Action for corresponding JP Application No. 2011-235341, dated Aug. 20, 2013.

Office Action for corresponding CN Application No. 2012104023959, dated Feb. 28, 2015.

* cited by examiner

FIG.7

| | LOCK DETERMINATION IN X-DIRECTION | LOCK DETERMINATION IN Y-DIRECTION | DIRECTION OF SCROLL |
|---|---|---|---|
| $X(t) < Th_x$<br>$Y(t) < Th_y$ | LOCKED | LOCKED | NOT SCROLLED |
| $X(t) < Th_x$<br>$Y(t) \geq Th_y$ | LOCKED | UNLOCKED | VERTICAL SCROLL |
| $X(t) \geq Th_x$<br>$Y(t) < Th_y$ | UNLOCKED | LOCKED | HORIZONTAL SCROLL |
| $X(t) \geq Th_x$<br>$Y(t) \geq Th_y$ | UNLOCKED | UNLOCKED | TWO-DIMENSIONAL SCROLL |

SCROLL CONTROL DEVICE, TERMINAL DEVICE, AND SCROLL CONTROL METHOD

BACKGROUND OF THE INVENTION

1. Field of the Invention

The present invention relates to a technology of controlling scroll of a screen and, more particularly, to a technology of controlling scroll on a touch screen.

2. Description of the Related Art

Interface devices such as touch panels and touch pads that allow users to provide an input with the touch of a finger are extensively used in various mobile devices and cell phones. Users can control the screen by touching a touch screen such as a touch panel or a touch pad with a finger, etc. An extensive range of products are now developed, including terminals such as cell phones provided with a touch panel display of a compact size that can be held by a single hand, and, more recently, tablet terminals provided with a touch panel display of a size large enough to enhance viewability of the display screen or facilitate browsing of high-quality images.

Patent document 1 discloses a mobile image display device provided with a display screen on both surfaces.

[patent document 1] JP2010-26064

Users browsing a web page on a terminal provided with a touch panel display cannot see the entire screen without scrolling the screen. Therefore, a scroll operation on a touch screen is essential. Generally, interfaces that allow the user to scroll a screen by touching a web page displayed on the touch screen with a finger and dragging the finger are common. Contrary to the expectation, it is often difficult to scroll the screen in a desired direction, which often frustrates the user. For example, the user may wish to scroll the screen vertically and touches the touch screen with a finger and drags the finger, but the finger may migrate transversely, with the result that the screen may be scrolled horizontally.

SUMMARY OF THE INVENTION

The present invention addresses the aforementioned issue and a purpose thereof is to provide a technology capable of scrolling the screen smoothly on a touch screen.

The scroll control device addressing the aforementioned issue comprises a control unit configured to restrict horizontal scrolling and/or vertical scrolling on a screen in accordance with a comparison result between one or more predetermined threshold values and at least a horizontal-coordinate value or a vertical-coordinate value of a current touch point with reference to a point of origin defined at a touch-start point at which a drag operation on a touch screen starts.

Another embodiment of the present invention relates to a terminal device. The terminal device is adapted to scroll and display a screen by a drag operation on a touch screen, comprising: a display unit configured to scroll and display the screen such that horizontal scrolling or vertical scrolling of the screen may be locked according to a comparison result between one or more predetermined threshold values and at least a horizontal-coordinate value or a vertical-coordinate value of a current touch point with reference to a point of origin defined at a touch-start point at which the drag operation on the touch screen starts.

Still another embodiment of the present invention relates to a scroll control method. In this method, scroll in at least one of a horizontal direction and a vertical direction of a screen is restricted according to a result of comparing at least one of predetermined threshold values with at least one of a coordinate value of a current touch point in the horizontal direction and a coordinate value in the vertical direction with reference to a point of origin defined at a start-of-touch point where the drag operation on the touch screen starts.

Yet another embodiment of the present invention relates to a computer program. The computer program comprises: a module configured to make a comparison between one or more predetermined threshold values and at least a horizontal-coordinate value or a vertical-coordinate value with reference to a point of origin defined at a touch-start point at which a drag operation on a touch screen starts; and a module configured to restrict horizontal scrolling or vertical scrolling of the screen according to the comparison.

Still another embodiment of the present invention also relates to a computer program. The computer program comprises: a module configured to determine, on a touch screen, a screen segment that a current touch point is located with reference to a point of origin defined at a touch-start point at which the drag operation on the touch screen starts, the screen segment defined by a predetermined horizontal threshold value and a predetermined vertical threshold value around the touch-start point at which a drag operation on a touch screen starts; and a module configured to restrict vertical scrolling and/or horizontal scrolling of the screen according to the determination.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 is a table that categorizes the direction of scroll according to the conditional expressions describing the relation between the threshold values for scroll lock and the X-coordinate value/Y-coordinate value of the current touch point in the drag operation;

DETAILED DESCRIPTION OF THE INVENTION

The invention will now be described by reference to the preferred embodiments. This does not intend to limit the scope of the present invention, but to exemplify the invention.

First Embodiment

Figure 1:
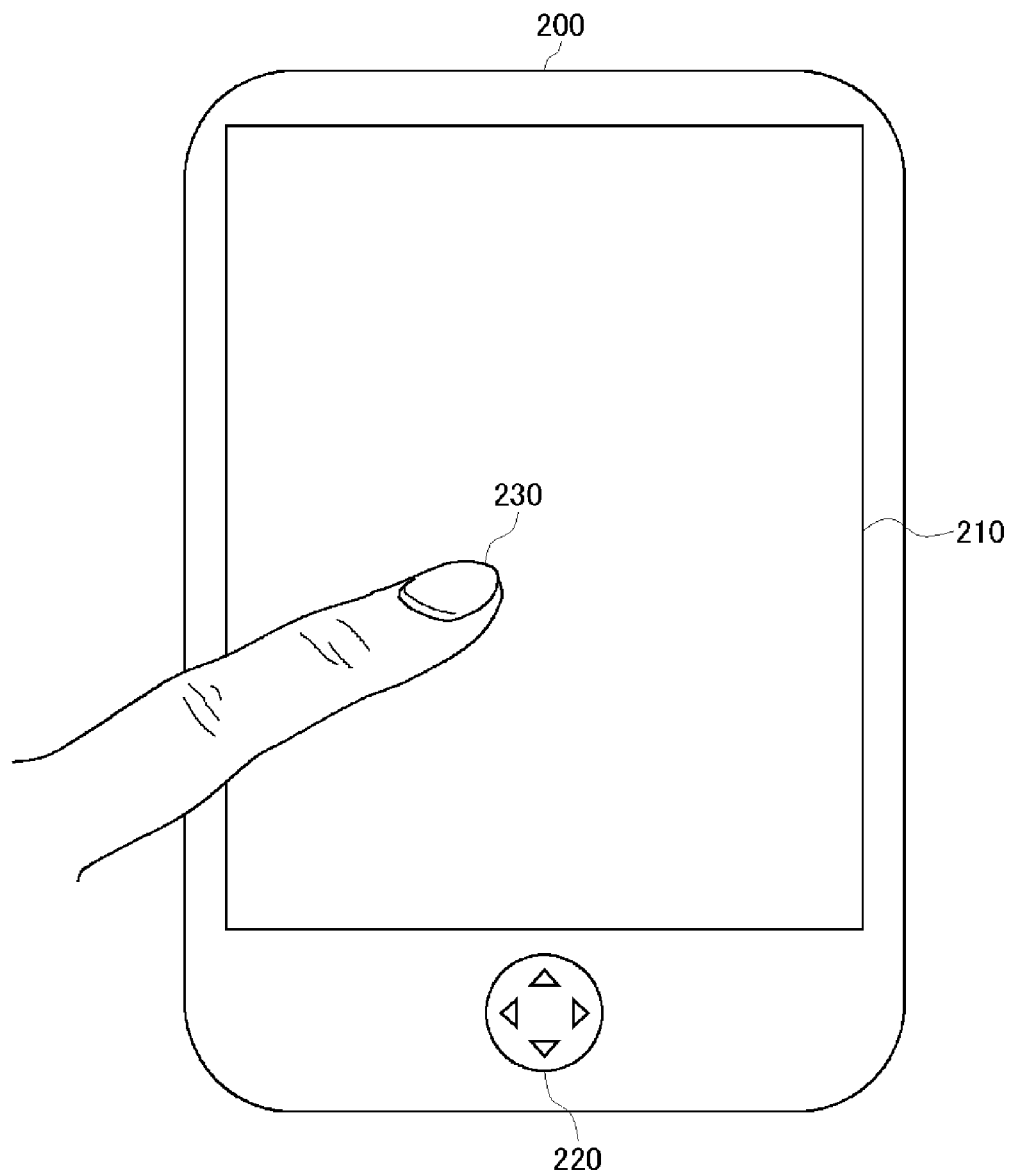
FIG. 1 shows the appearance of the mobile terminal according to the first embodiment.

FIG. 1 shows the appearance of a mobile terminal 200 according to the first embodiment. For example, the mobile terminal 20 may be a cell phone, a mobile information terminal, a game device, a tablet computer, etc. In addition to a touch screen 210, the mobile terminal 200 is provided with a button 220 or input and output functions embodied by, for example, a camera (not shown) as necessary.

The touch screen 210 is a display provided with a touch panel and is an input device capable of sensing a point (position) of contact (hereinafter, "touch point (position)") by the finger, etc., and parameters such as electrostatic capacitance or electric resistance indicating the contact state at the touch point (position). The touch panel is mounted on a display such as a liquid crystal display or an electroluminescence display. This allows the user viewing the screen on the display to provide an input for control on the screen by directly touching the touch panel with a finger.

Figure 2:
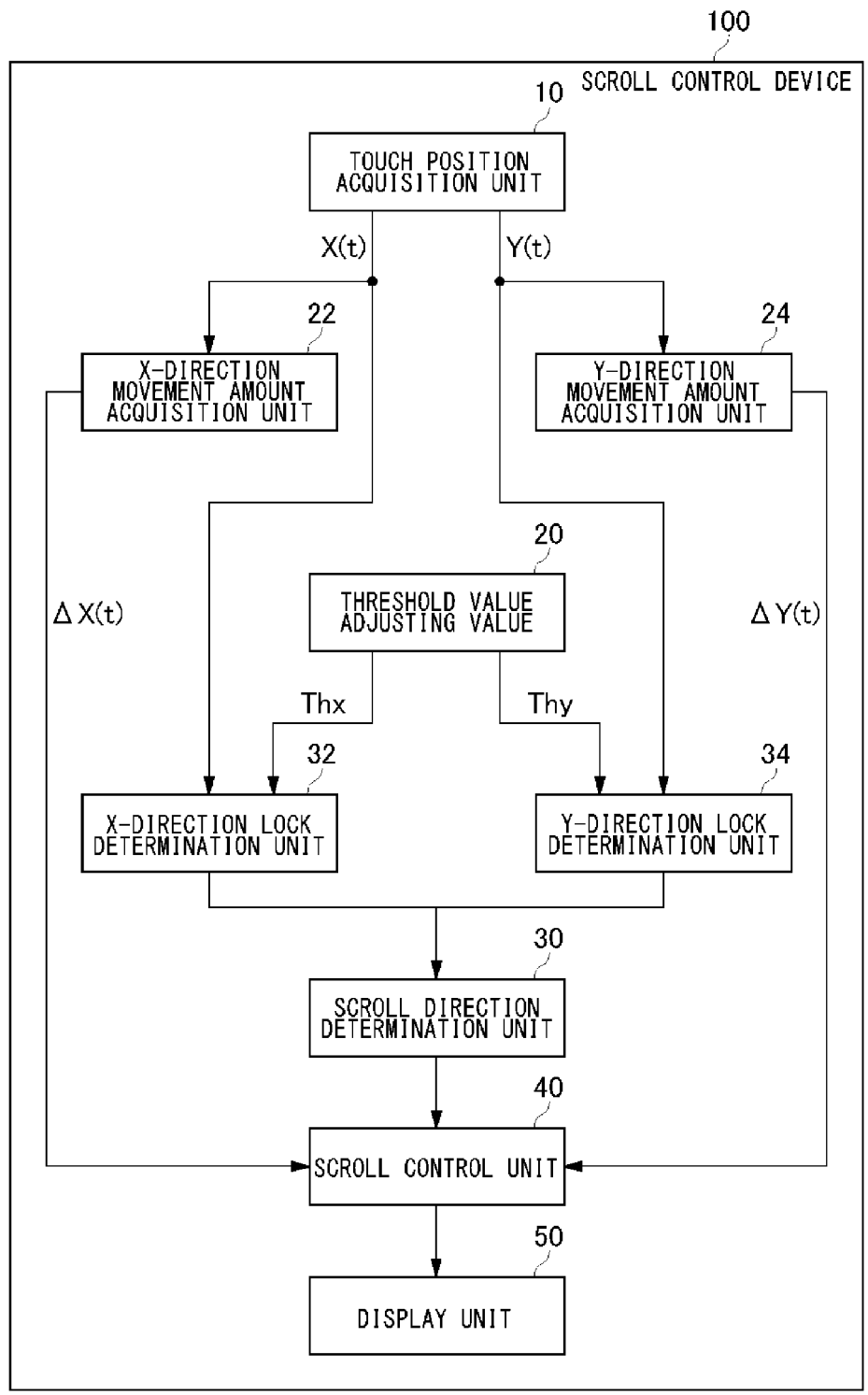
FIG. 2 shows the configuration of the scroll control device for controlling scroll of a screen on the touch screen of FIG. 1.

FIG. 2 shows the configuration of a scroll control device 100 for controlling scroll of a screen on the touch screen 210 of FIG. 1. The functions of the scroll control device 100 shown in FIG. 2 can be implemented in whole or in part by hardware, software, or a combination thereof. The mobile terminal 200 will inherently be provided with functions other than that of the scroll control device 100. However, such functions are not related to the description of the embodiment so that a description of the functions other than that of scroll control is omitted.

The scroll control device 100 is provided with a touch position acquisition unit 10, a threshold value adjustment unit 20, an X-direction movement amount acquisition unit 22, a Y-direction movement amount acquisition unit 24, a scroll direction determination unit 30, an X-direction lock determination unit 32, a Y-direction lock determination unit 34, a scroll control unit 40, and a display unit 50.

A touch panel controller (not shown) connected to the touch screen 210 measure an amount of variation in electrostatic capacitance at respective points on the touch screen 210 so as to detect a position of a touch point and an intensity of touch. The position of a touch point and the touch intensity are sampled at a sampling period of, for example, 1/60 seconds. While the user is touching the touch screen 210 and dragging the finger, positional coordinates of the touch point and touch intensity are acquired as time-series data.

For example, the touch panel is of a capacitive type. The touch position acquisition unit 10 measures an amount of variation in electrostatic capacitance at respective points on the touch panel so as to detect a position of a touch point and an electrostatic capacitance value at the touch point. Any type of touch panel other than that of a capacitive type can be used so long as it is possible to acquire some measurement amounts as time-series data when a finger or a pen touches the panel. For example, the touch panel may be of a pressure-sensitive type or an optical type.

The touch position acquisition unit 10 receives the time-series data for positional coordinates of touch points from the touch controller. The touch position acquisition unit 10 refers to the time-series data for positional coordinates of touch points occurring in a drag operation whereby the user touches the touch screen 210 with a finger and sliding the finger over the screen 210, and acquires the coordinates of a starting point where the drag operation starts and the current touch point. Further, the touch position acquisition unit 10 is capable of acquiring the position where the drag operation is terminated and a finger 230 is detached from the touch screen 210 as a point where the drag operation is terminated.

The touch position acquisition unit 10 identifies the X-coordinate value X(t) and the Y-coordinate value Y(t) of the touch point at current time t in the coordinate system in which the point of origin is defined at the starting point where the drag operation starts, the latitudinal (horizontal) direction of the touch screen 210 is defined as the X-axis, and the longitudinal (vertical) direction is defined as the Y-axis. The touch position acquisition unit 10 supplies the X-coordinate value X(t) to the X-direction movement amount acquisition unit 22 and the X-direction lock determination unit 32, and supplies the Y-coordinate value Y(t) to the Y-direction movement amount acquisition unit 24 and the Y-direction lock determination unit 34. When the coordinates of touch points input via the touch panel controller are defined in the XY-coordinate system with the point of origin defined at the bottom left corner of the touch screen 210, the coordinate values of the current touch point with reference to the starting point where the drag operation starts as the point of origin can be identified by subtracting the X-coordinate value and the Y-coordinate value of the starting point from the X-coordinate value and the Y-coordinate value of the current touch point, respectively.

The X-direction movement amount acquisition unit 22 identifies an amount of movement ΔX(t) in the X-direction by identifying a difference X(t)−X(t−1) between the X-coordinate value X(t−1) of a past touch point in the drag operation and the X-coordinate value X(t) of the current touch point. The Y-direction movement amount acquisition unit 24 identifies an amount of movement ΔY(t) in the Y-direction by identifying a difference Y(t)−Y(t−1) between the Y-coordinate value Y(t−1) of a past touch point in the drag operation and the Y-coordinate value Y(t) of the current touch point.

The X-coordinate value and the Y-coordinate value of a past touch point may be the X-coordinate value and the Y-coordinate value of a touch point sampled in the immediately preceding sampling period, or the X-coordinate value and the Y-coordinate value of a touch point sampled in a period preceding the current period by a predetermined number of periods. Alternatively, the X-coordinate value and the Y-coordinate value of the starting point where the drag operation starts may be used as the X-coordinate value and the Y-coordinate value of a past touch point.

The X-direction movement amount acquisition unit 22 supplies the scroll control unit 40 with the X-direction movement amount ΔX(t) at current time t as determined above. The Y-direction movement amount acquisition unit 24 supplies the scroll control unit 40 with the Y-direction movement amount ΔY(t) at current time t as determined above.

When the X-coordinate value X(t) of the touch point at current time t during the drag operation is less than a predetermined threshold value Thx, the screen is not scrolled in the X-direction. Similarly, when the Y-coordinate value Y(t) of the touch point at current time t is less than a predetermined threshold value Thy, the screen is not scrolled in the Y-direction. This will be referred to as lock of scroll.

The threshold value adjustment unit 20 defines the threshold value Thx for scroll lock in the X-direction and the threshold value Thy for scroll lock in the Y-direction, and supplies the threshold values to the X-direction lock determination unit 32 and the Y-direction lock determination unit 34, respectively. The threshold values Thx and Thy may be fixed values. Alternatively, in order to ensure that the screen is scrolled as intended by the user, the threshold values Thx, Thy may be variable as described later. For example, the threshold values may be varied gradually from the maximum values Thx_max, Thy_max to the minimum values Thx_min, Thy_min within a predetermined time limit. In this case, the threshold adjustment unit 20 supplies the automatically adjusted threshold values Thx, Thy to the X-direction lock determination unit 32 and the Y-direction lock determination unit 34, respectively, at a frequency substantially equal to the sampling frequency of touch points.

When the X-coordinate value X(t) of the touch point at time t is less than the threshold value Thx, the X-direction lock determination unit 32 locks scroll in the X-direction and establishes a lock state. So long as the X-coordinate value X(t) at time t remains less than the threshold value Thx, the lock state of scroll in the X-direction is maintained. The X-direction lock determination unit 32 releases scroll lock in the X-direction and establishes an unlock (released lock) state when the X-coordinate value X(t) of the touch point at time t exceeds the threshold value Thx. When the X-coordinate value X(t) of the touch point is equal to the threshold value Thx, whichever of a lock state or an unlock state may be established.

Similarly, when the Y-coordinate value Y(t) of the touch point at time t is less than the threshold value Thy, the Y-direction lock determination unit 34 locks scroll in the Y-direction and establishes a lock state. So long as the Y-coordinate value Y(t) at time t remains less than the threshold value Thy, the lock state of scroll in the Y-direction is maintained. The Y-direction lock determination unit 34 releases scroll lock in the Y-direction and establishes an unlock (released lock) state when the Y-coordinate value Y(t) of the touch point at time t exceeds the threshold value Thy. When the Y-coordinate value Y(t) of the touch point is equal to the threshold value Thy, whichever of a lock state or an unlock state may be established.

The scroll direction determination unit 30 receives notification of a lock/unlock of scroll in the X-direction from the X-direction lock determination unit 32 and notification of lock/unlock of scroll in the Y-direction from the Y-direction lock determination unit 34. The scroll direction determination unit 30 determines "horizontal scroll", "vertical scroll", or "two-dimensional scroll" of the screen based on the lock/unlock state of scroll in the X-direction and the Y-direction.

"Horizontal scroll" means that the screen is scrolled only in the X-direction (horizontal direction) and not scrolled (locked) in the Y-direction (vertical direction). "Vertical scroll" means that the screen is scrolled only in the Y-direction (vertical direction) and not scrolled (locked) in the X-direction (horizontal direction). "Two-dimensional scroll" means that the screen is scrolled both in the X-direction (horizontal direction) and the Y-direction (vertical direction), i.e., in desired directions (including diagonal directions) on a two-dimensional plane.

When scroll is locked both in the X-direction and the Y-direction, the scroll direction determination unit 30 determines not to scroll the screen.

When scroll in the X-direction is unlocked and scroll in the Y-direction is locked, the scroll direction determination unit 30 determines that the screen should be scrolled horizontally because lock of scroll is released only in the X-direction.

When scroll in the Y-direction is unlocked and scroll in the X-direction is locked, the scroll direction determination unit 30 determines that the screen should be scrolled vertically because lock of scroll is released only in the Y-direction.

When scroll in the X-direction and scroll in the Y-direction are both unlocked, the scroll direction determination unit 30 determines that the screen should be scrolled two-dimensionally because lock of scroll is released in both directions.

The scroll control unit 40 scrolls the screen in the scroll direction determined by the scroll direction determination unit 30, based on the X-direction movement amount ΔX(t) at current time t supplied from the X-direction movement amount acquisition unit 22 and the Y-direction movement amount ΔY(t) at current time t supplied from the Y-direction movement amount acquisition unit 24.

When it is determined that the screen should be scrolled horizontally, the scroll control unit 40 scrolls the screen in the horizontal direction by a scroll amount determined by (e.g., proportional to) the X-direction movement amount ΔX(t). In this case, the Y-direction movement amount ΔY(t) supplied from the Y-direction movement amount acquisition unit 24 is disregarded.

When it is determined that the screen should be scrolled vertically, the scroll control unit 40 scrolls the screen in the vertical direction by a scroll amount determined by (e.g., proportional to) the Y-direction movement amount ΔY(t). In this case, the X-direction movement amount ΔX(t) supplied from the X-direction movement amount acquisition unit 22 is disregarded.

When it is determined that the screen should be scrolled two-dimensionally, the scroll control unit 40 scrolls the screen in the horizontal direction by a scroll amount determined by (e.g., proportional to) the X-direction movement amount ΔX(t) and in the vertical direction by a scroll amount determined by (e.g., proportional to) the Y-direction movement amount ΔY(t). In other words, the scroll control unit 40 scrolls the screen in a direction determined by a movement vector (ΔX(t), ΔY(t)) by a scroll amount determined by (e.g., proportional to) the magnitude of the movement vector.

A publicly known technology is used to control scroll of a screen. The display unit 50 displays a screen that is scrolled.

Figure 3A:
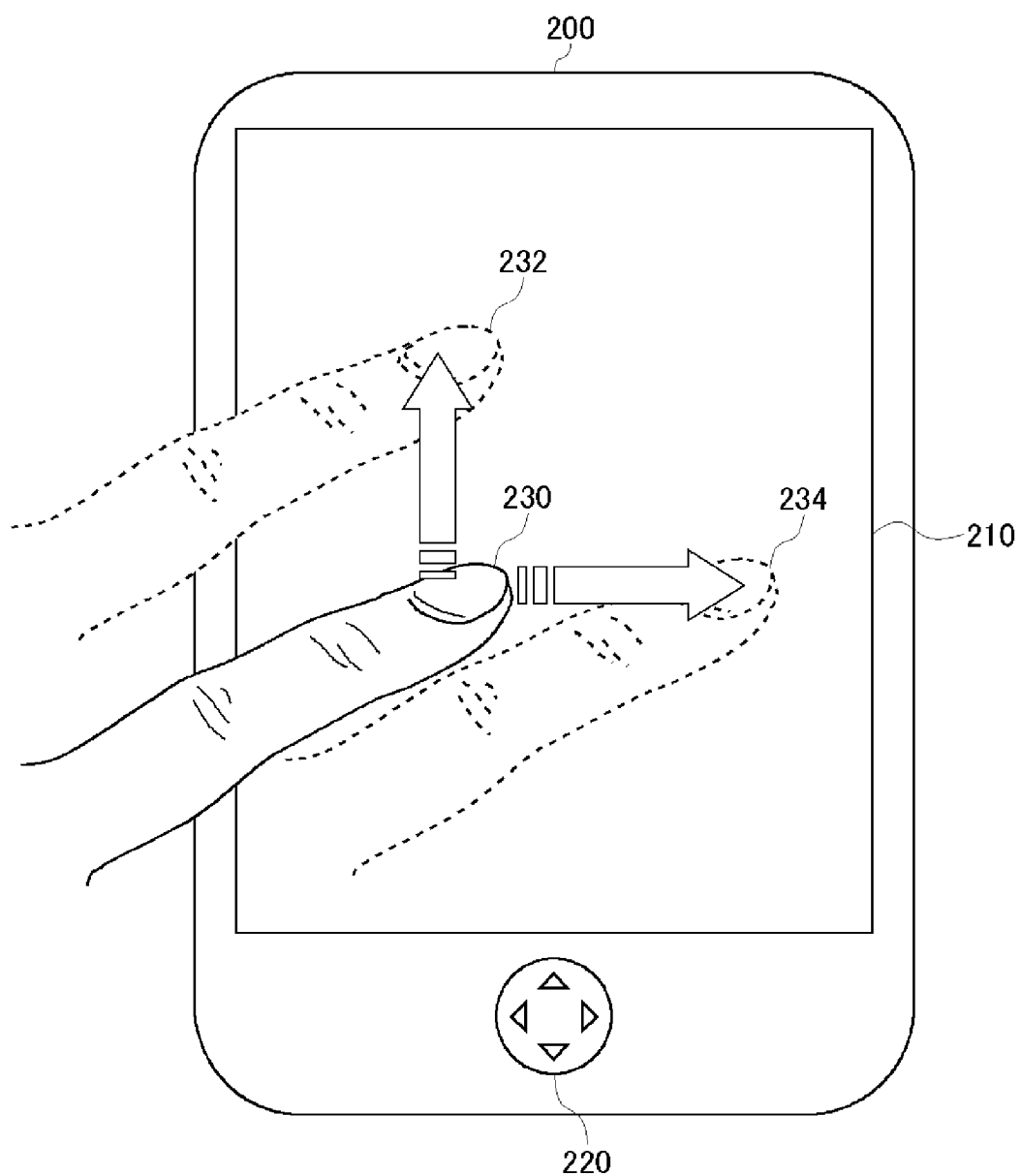
FIG. 3A shows a drag operation whereby the user touches the touch screen of a mobile terminal with a finger and shifts the finger vertically or horizontally.
Figure 3B:
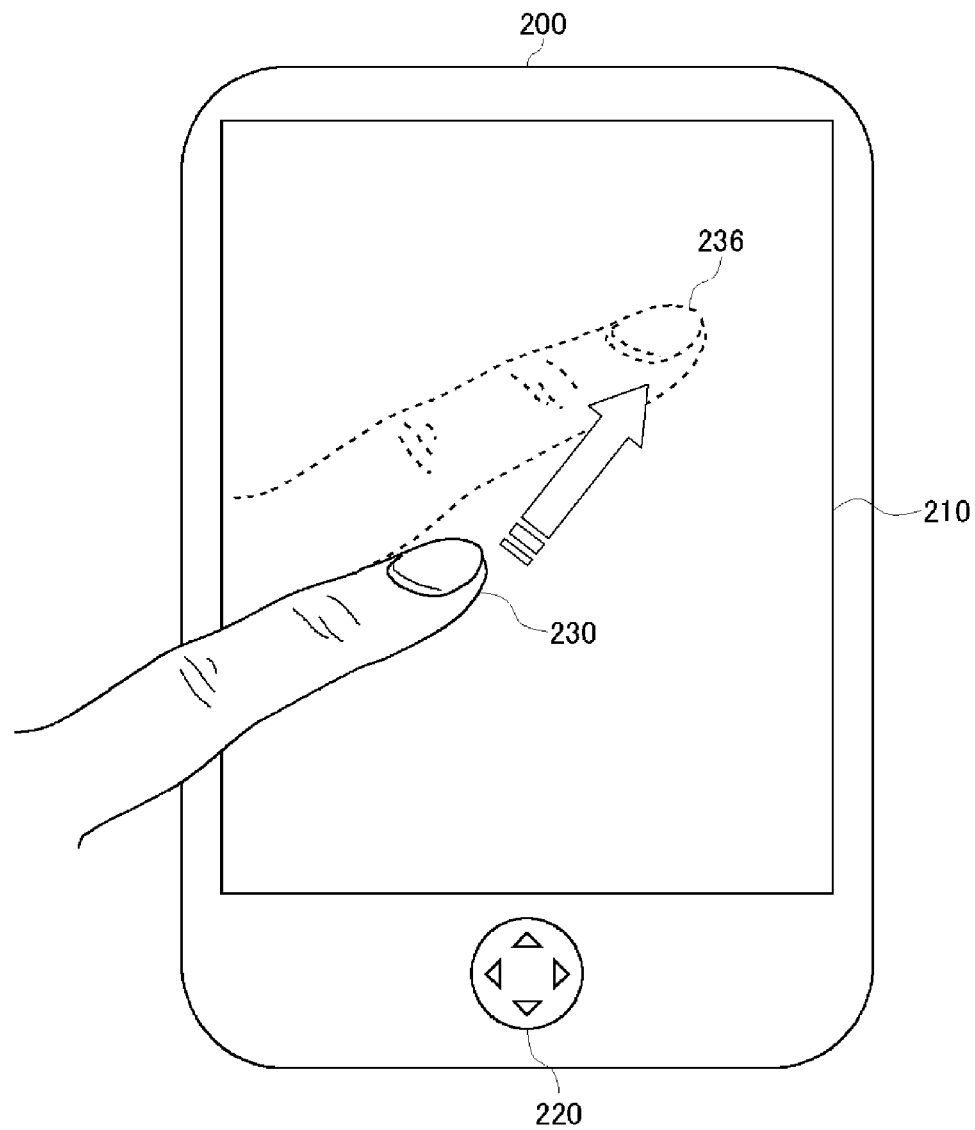
FIG. 3B shows a drag operation whereby the user touches the touch screen of a mobile terminal with a finger and shifts the finger diagonally.

FIGS. 3A and 3B show a drag operation whereby the user touches the touch screen 210 of the mobile terminal 200 and slides the finger vertically, horizontally, or diagonally.

FIG. 3A shows how the finger 230 remains in contact with the touch screen 210 and is moved vertically and dragged to a position indicated by a symbol 232, or how the finger 230 remains in contact with the touch screen 210 and is moved right and dragged to a position indicated by a symbol 234. FIG. 3B shows how the finger 230 remains in contact with the touch screen 210 and is moved toward top right and dragged to a position indicated by a symbol 236.

As a result of the drag operation on the touch screen 210 shown in FIGS. 3A and 3B, the user can scroll the screen horizontally, vertically, or two-dimensionally.

Figure 4:
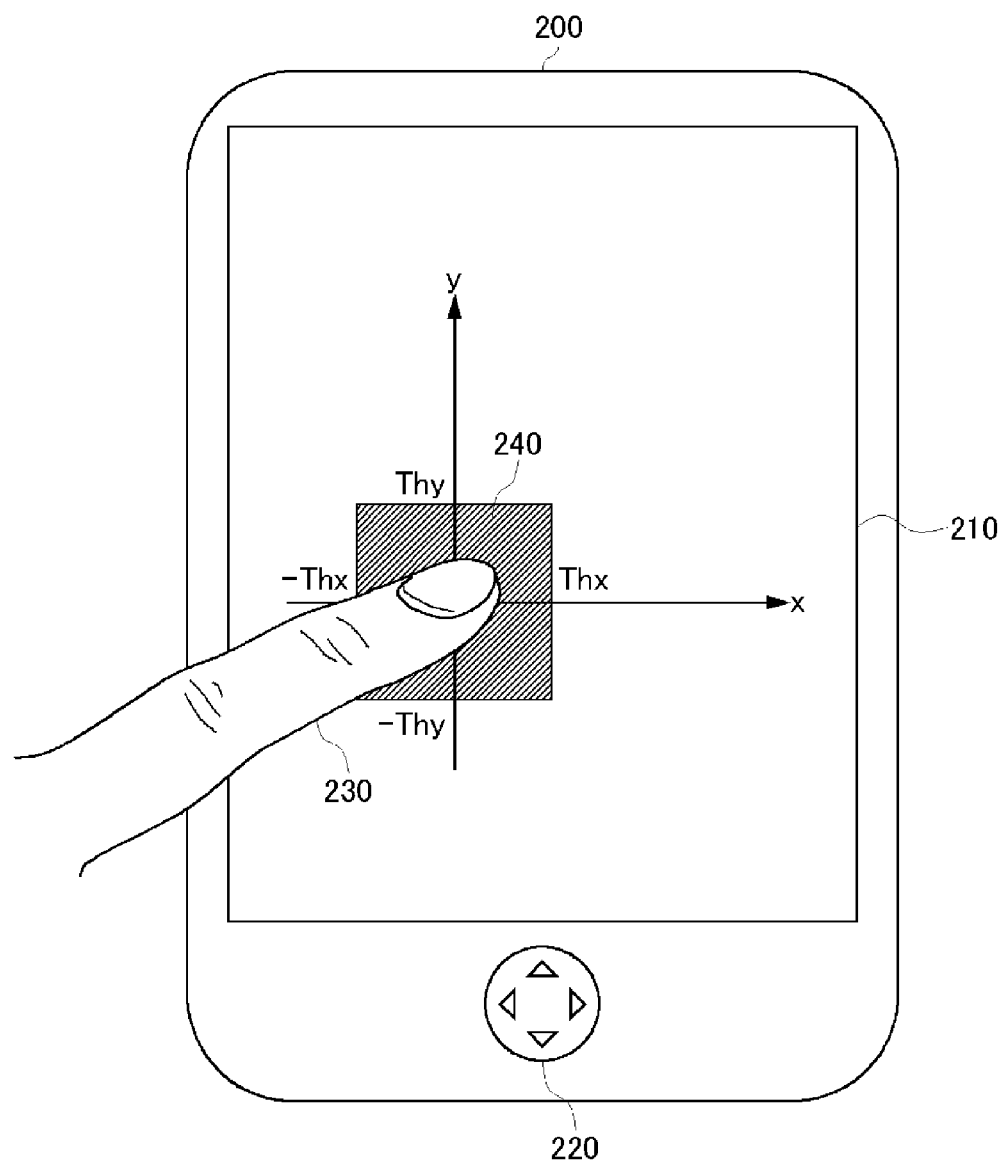
FIG. 4 shows an insensitive area in a scroll operation.

FIG. 4 shows an insensitive area 240 in a scroll operation. The starting point on the touch screen 210 with which the finger 230 is in contact when a drag operation starts is defined as a point of origin. The horizontal direction is defined as the X-axis, and the vertical direction is defined as the Y-axis. Given the threshold value Thx for scroll lock in the X-direction and the threshold value Thy for scroll lock in the Y-direction, the rectangular area defined by apexes (Thx, Thy), (Thx, −Thy), (−Thx, −Thy), and (−Thx, Thy) is the insensitive area 240. A drag within the insensitive are 240 does not result in a scroll because scroll is locked in both the X-direction and the Y-direction.

A drag operation may occur in the negative direction of the X-axis or in the negative direction of the Y-axis. For brevity, the following description assumes that the drag occurs in the positive direction both in the X-axis the Y-axis.

The threshold value Thx for scroll in the X-direction and the threshold value Thy for scroll in the Y-direction may be equal or different. The user who moves the finger 230 is conscious of the extent of an area on the touch screen 210 of the mobile terminal 200. Therefore, when the touch screen 210 is vertically elongated, the user tends to move the finger more in the Y-direction (vertical direction) than in the X-direction (horizontal direction). When the touch screen 210 is horizontally elongated, the user tends to move the finger more in the X-direction (horizontal direction) than in the Y-direction (vertical direction). In this regard, in the case of a vertically elongated screen, the threshold value Thy for scroll in the Y-direction may be configured to be larger than the threshold value Thx for scroll in the X-direction. In the caser of a horizontally elongated screen, the threshold value Thx for scroll in the X-direction may be configured to be larger than the threshold value Thy for scroll in the Y-direction. Alternatively, the ratio between the threshold value Thy in the Y-direction and the threshold value Thx in the X-direction may be defined according to the aspect ratio of the touch screen 210.

Figure 5A:
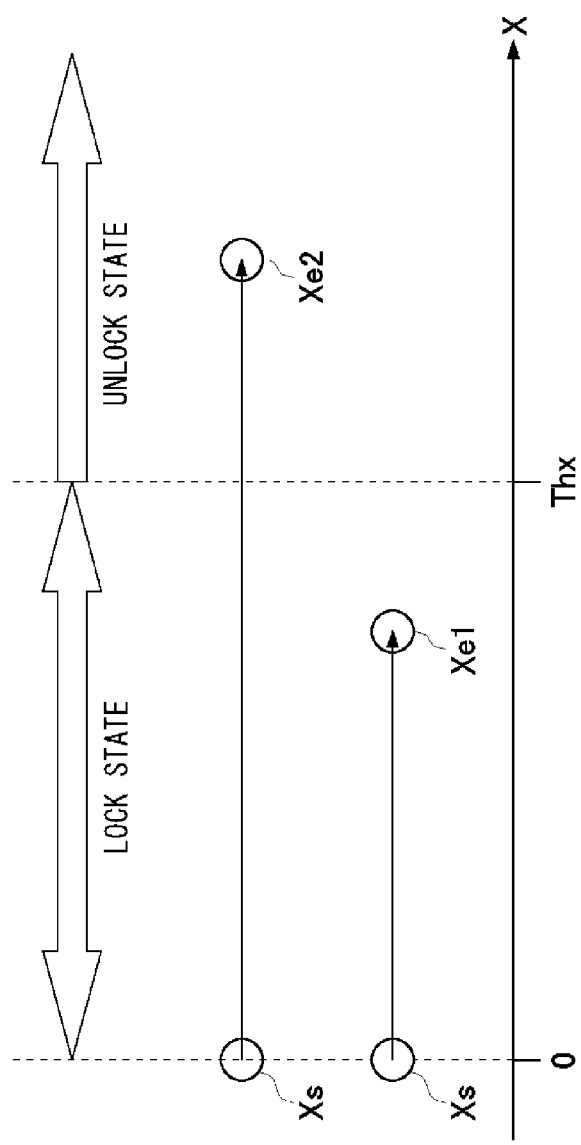
FIG. 5A shows how a threshold value for scroll lock in the X-axis direction is related to a lock/unlock of scroll.

FIG. 5A shows how a threshold value for scroll lock in the X-axis direction is related to a lock/unlock of scroll.

The X-coordinate value at the starting point where the finger 230 starts to be dragged on the touch screen 210 will be indicated by Xs, and the X-coordinate value of the current touch point in the drag operation will be indicated by Xe. Since the starting point is defined as the point of origin, the X-coordinate value of the starting point is such that Xs=0. When the X-coordinate value of the current touch point is such that Xe=Xe1 (<Thx), the threshold value Thx for scroll lock in the X-direction is not reached so that scroll in the X-direction remains locked. In contrast, when the X-coordinate value of the current touch point is such that Xe=Xe2 (≥Thx), the threshold value Thx for scroll lock in the X-direction is exceeded so that lock of scroll in the X-direction is released and an unlock state is established.

Figure 5B:
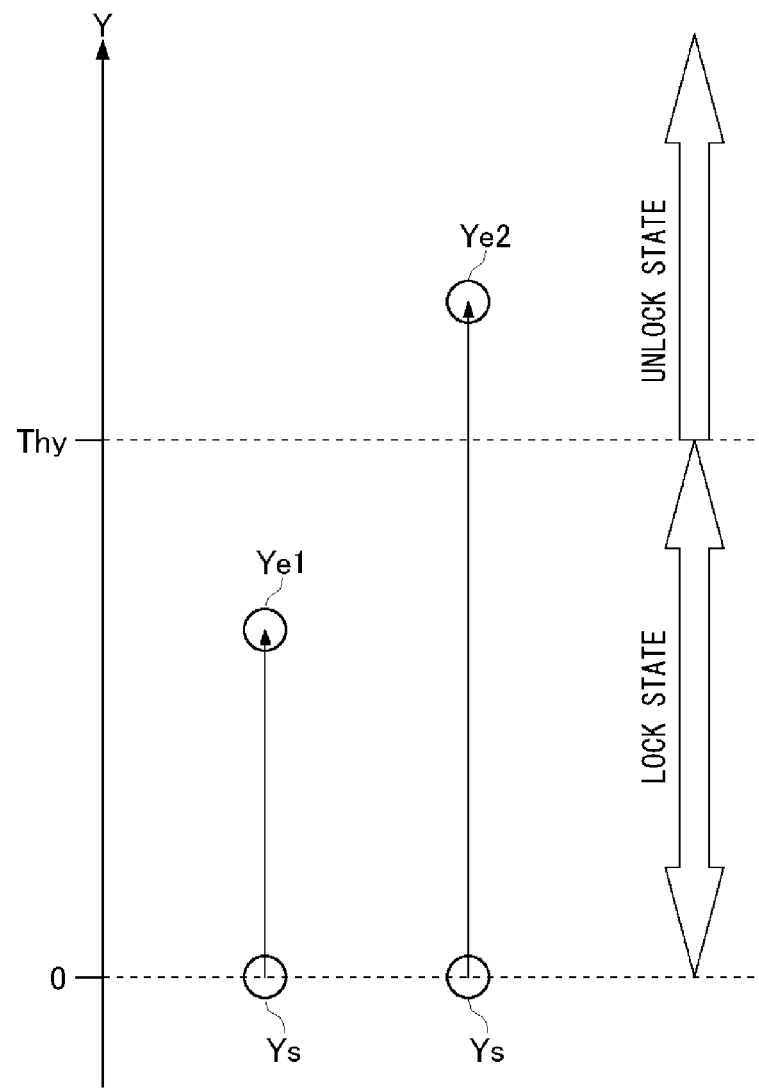
FIG. 5B shows how a threshold value for scroll lock in the Y-axis direction is related to a lock/unlock of scroll.

FIG. 5B shows how a threshold value for lock of scroll in the Y-axis direction is related to a lock/unlock of scroll.

The Y-coordinate value at the starting point where the finger 230 starts to be dragged on the touch screen 210 will be indicated by Ys, and the Y-coordinate value of the current touch point in the drag operation will be indicated by Ye. Since the starting point is defined as a point of origin, the Y-coordinate value of the starting point is such that Ys=0. When the Y-coordinate value of the current touch point is such that Ye=Ye1 (<Thy), the threshold value Thy for lock of scroll in the Y-direction is not reached so that scroll in the Y-direction remains locked. In contrast, when the Y-coordinate value of the current touch point is such that Ye=Ye2 (≥Thy), the threshold value Thy for lock of scroll in the Y-direction is exceeded so that scroll lock in the Y-direction is released and an unlock state is established.

Figure 6:
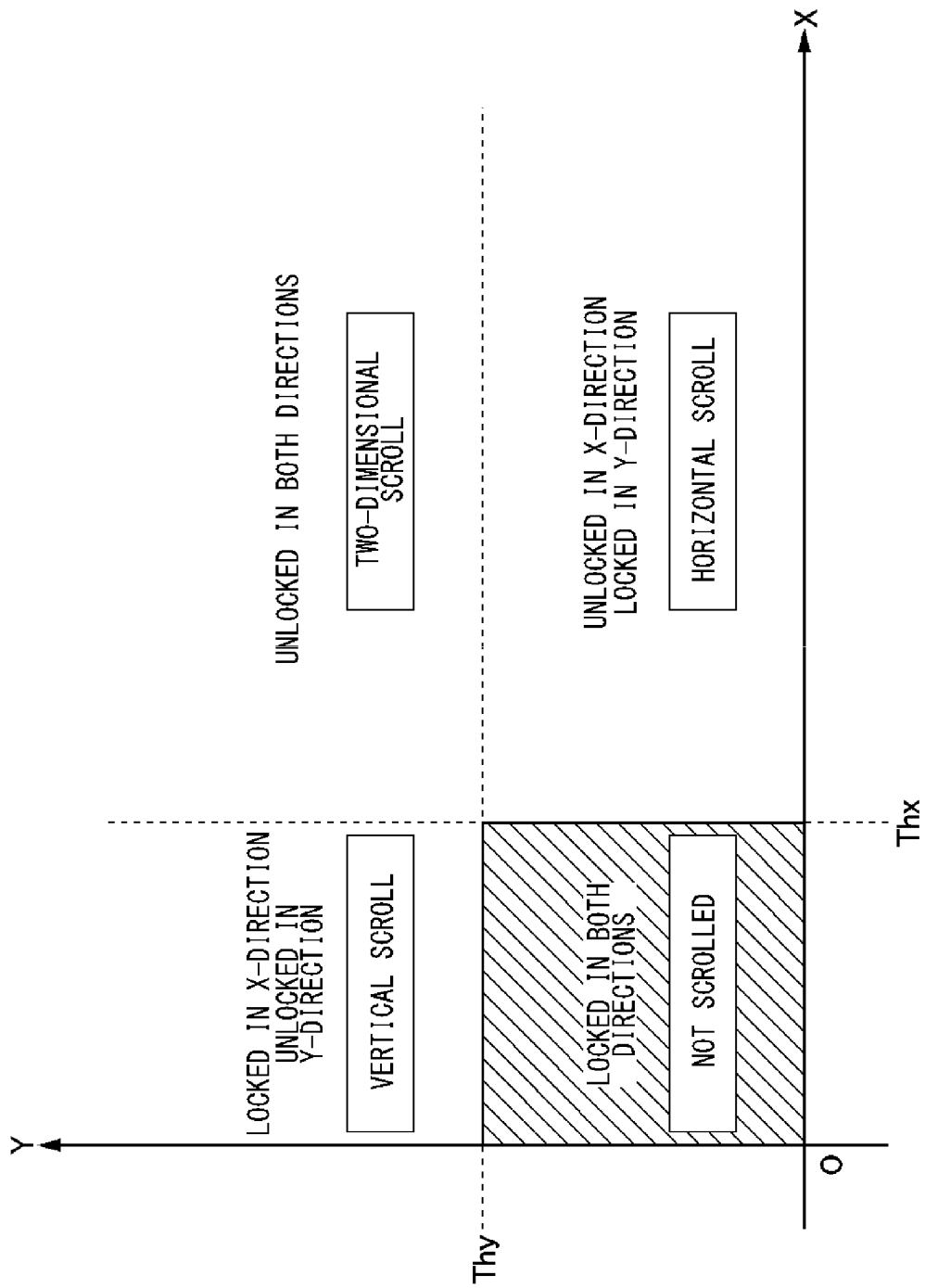
FIG. 6 shows how threshold values for scroll lock in the X-axis direction and the Y-axis direction are related to the direction of scroll.

FIG. 6 shows how the threshold values for scroll lock in the X-axis direction and the Y-axis direction are related to the direction of scroll.

When the starting point where the drag operation starts is defined as a point of origin, scroll is locked both in the X-direction and the Y-direction and the screen is not scrolled if the X-coordinate value Xe of the current touch point in the drag operation is such that Xe<Thx and the Y-coordinate value Ye is such that Ye<Thy.

If Xe≥Thx and Ye<Thy, scroll in the X-direction is unlocked and scroll in the Y-direction is locked so that the screen is scrolled horizontally.

If Xe<Thx and Ye≥Thy, scroll in the X-direction is locked and scroll in the Y-direction is unlocked so that the screen is scrolled vertically.

If Xe≥Thx and Ye≥Thy, scroll is unlocked both in the X-direction and the Y-direction so that the screen is scrolled two-dimensionally.

FIG. 7 is a table that categorizes the direction of scroll according to the conditional expressions describing the relation between the threshold values for scroll lock and the X-coordinate value X(t)/Y-coordinate value Y(t) of the current touch point in the drag operation.

(1) If the X-coordinate value X(t)<Thx and the Y-coordinate value Y(t)<Thy, scroll is locked in the X direction and locked in the Y-direction so that the screen is not scrolled.

(2) If the X-coordinate value X(t)<Thx and the Y-coordinate value Y(t)≥Thy, scroll is locked in the X direction and unlocked in the Y-direction so that the screen is scrolled vertically.

(3) If the X-coordinate value X(t)≥Thx and the Y-coordinate value Y(t)<Thy, scroll is unlocked in the X direction and locked in the Y-direction so that the screen is scrolled horizontally.

(4) If the X-coordinate value X(t)≥Thx and the Y-coordinate value Y(t)≥Thy, scroll is unlocked in the X direction and unlocked in the Y-direction so that the screen is scrolled two-dimensionally.

Figure 8A:
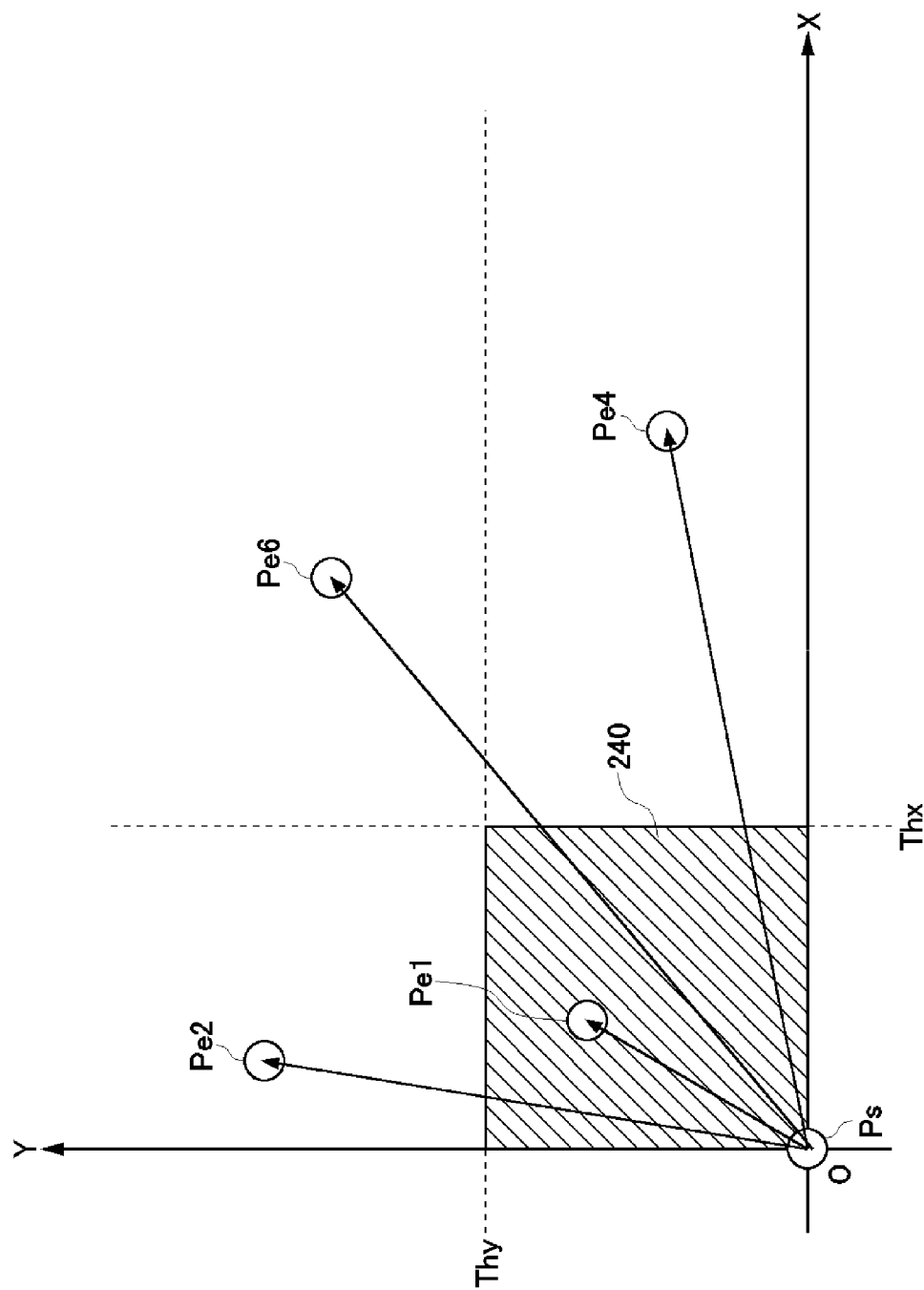
FIG. 8A shows a starting point where the drag operation starts and current touch points by way of example.

FIG. 8A shows a starting point where the drag operation starts and current touch points by way of example. The following description assumes an XY-coordinate system with a starting point Ps as the point of origin. Touch points Pe1, Pe2, Pe4, and Pe6 occur at current time t as a result of different drag operations.

The X-coordinate value of the touch point Pe1 is less than the threshold value Thx and the Y-coordinate value thereof is also less than the threshold value Thy. The coordinates are in the insensitive area 240 so that the screen is not scrolled in this case. The X-coordinate value of the touch point Pe2 is less than the threshold value Thx so that scroll in the X-direction is locked, and the Y-coordinate value thereof exceeds the threshold value Thy so that scroll in the Y direction is unlocked. As a result, the screen is scrolled vertically. The X-coordinate value of the touch point Pe4 exceeds the threshold value Thx so that scroll in the X-direction is unlocked, and the Y-coordinate value thereof is less than the threshold value Thy so that scroll in the Y direction is locked. As a result, the screen is scrolled horizontally. The X-coordinate value of the touch point Pe6 exceeds the threshold value Thx and the Y-coordinate value thereof also exceeds the threshold value Thy so that the screen is scrolled two-dimensionally.

FIG. 8A depicts cases where the finger is shifted linearly from the starting point Ps to the touch points Pe1, Pe2, Pe4, and Pe6 in the respective drag operations. The path that occurs in the middle of a drag operation may not necessarily be linear but may be curved.

Figure 8B:
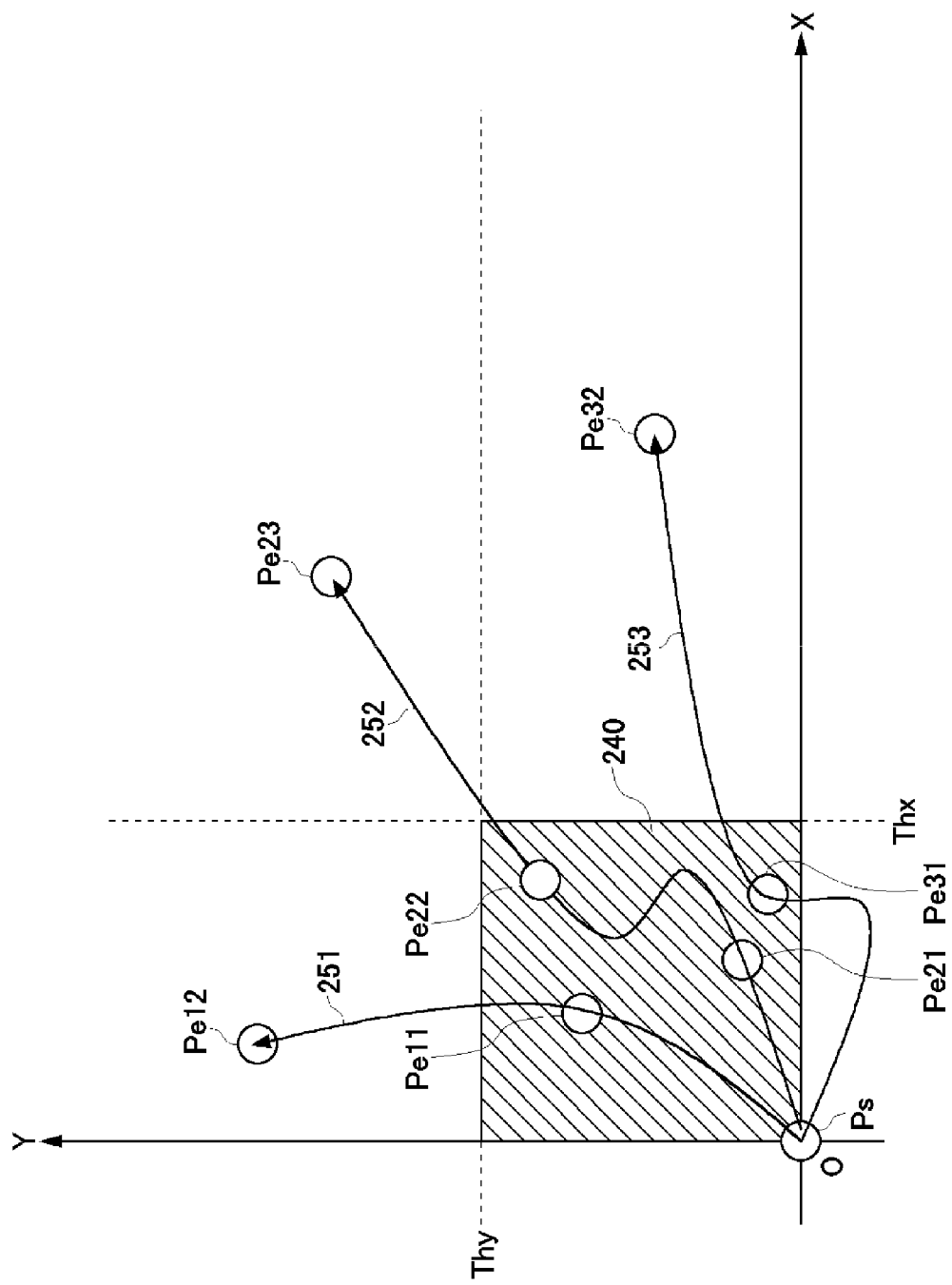
FIG. 8B shows a starting point where the drag operation starts and current touch points by way of example, along with the respective paths in which the finger is dragged.

FIG. 8B shows a starting point where the drag operation starts and current touch points by way of example, along with the respective paths in which the finger is dragged.

A first drag path 251 shows that the drag starts at the starting point Ps, and a touch point Pe11 is sampled in the subsequent sampling period. In the subsequent sampling period, the drag arrives at a current touch point Pe12. The touch point Pe11 is located within the insensitive area 240 so that scroll is locked in both directions. The Y-coordinate value of the touch point Pe12 exceeds the threshold value Thy so that scroll in the Y-direction is unlocked and vertical scroll starts. Once the lock is released and the direction of scroll is established, the established direction of scroll is maintained subsequently.

A second drag path 252 shows that the drag starts at the starting point Ps, a touch point Pe21 is sampled in the subsequent sampling period, and a touch point Pe22 is sampled in the subsequent sampling period. The drag ultimately arrives at a current touch point Pe23. The touch points Pe21 and Pe22 are located within the insensitive area 240 so that scroll is locked in both directions. The X-coordinate value of the touch point Pe23 exceeds the threshold value Thx and the Y-coordinate value thereof also exceeds the threshold value Thy so that scroll is unlocked in both directions and two-dimensional scroll starts. Once the two-dimensional scroll is established, the two-dimensional scroll is maintained subsequently.

Similarly, a third drag path 253 shows that the drag starts at the starting point Ps, and a touch point Pe31 is sampled in the subsequent sampling period. In the subsequent sampling period, the drag ultimately arrives at a current touch point Pe32. The touch point Pe31 is located within the insensitive area 240 so that scroll is locked in both directions. The X-coordinate value of the touch point Pe32 exceeds the threshold value Thx so that scroll in the X-direction is unlocked and horizontal scroll starts.

The description assumes that the threshold values Thx and Thy for scroll lock in the X-direction and the Y-direction are fixed values. It is favorable to vary the threshold values Thx and Thx in the middle of a drag operation by the user in order to ensure that the screen is scrolled as intended by the user. A description will be given, with reference to FIGS. 9-12, of the reason for and the advantage of varying the threshold values.

Figure 9:
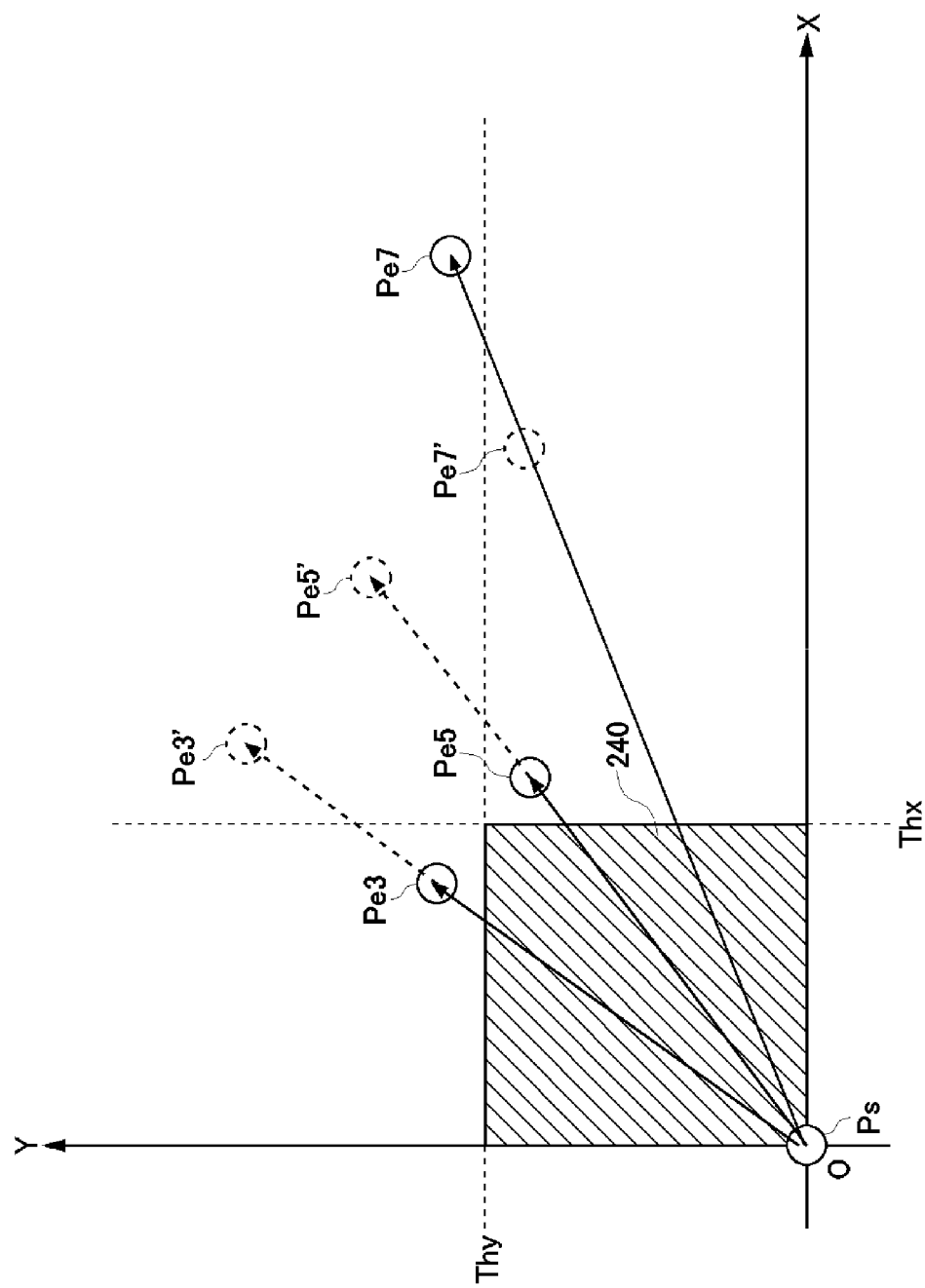
FIG. 9 shows a case where the threshold values for scroll lock are fixed.

FIG. 9 shows a case where the threshold values for scroll lock are fixed.

It will be assumed that the starting point Ps of the drag operation is defined as the point of origin and the user slowly drags the finger 230 toward a target point Pe3' for two-dimensional scroll. If the finger is dragged slowly and if the sampling period is shorter than the time consumed by the drag operation, a point Pe3 preceding the target is sampled ahead as a touch point in the middle of dragging the finger toward the target point Pe3'. The concurrent Y-coordinate value of the touch point Pe3 exceeds Thy, but the X-coordinate value does not exceed Thx so that vertical scroll is established in this case. Since the direction of scroll once established is maintained, two-dimensional scroll as intended by the user does not take place even if the user drags the finger toward the target point Pe3' subsequently.

By way of a similar example, it will be assumed the user slowly drags the finger 230 from the starting point Ps toward a target point Pe5' for two-dimensional scroll. If the finger is dragged slowly and if the sampling period is shorter than the time consumed by the drag operation, a point Pe5 preceding the target is sampled ahead as a touch point in the middle of dragging the finger toward the target point Pe5'. The concurrent X-coordinate value of the touch point Pe5 exceeds Thx, but the Y-coordinate value does not exceed Thy so that horizontal scroll is established in this case. Two-dimensional scroll does not take place even if the user drags the finger toward the target point Pe5' subsequently.

Meanwhile, a quick movement of the finger 230 by the user results in the following. It will be assumed that the user quickly drags the finger 230 from the starting point Ps for horizontal scroll. A quick drag results in migration of the finger 230 so that the finger is dragged to a point Pe7 in which the Y-coordinate value exceeds the threshold value Thy. The point Pe7 is detected as a touch point in the subsequent sampling period. If the drag occurs slowly, a preceding point Pe7' may be sampled as a touch point in the subsequent sampling period. A quick drag causes the finger to advance to the point Pe7 before it is time to sample a point. Not only the X-coordinate value of the point Pe7 exceeds the threshold value Thx but also the Y-coordinate value exceeds the threshold value Thy so that two-dimensional scroll takes place. Horizontal scroll as intended by the user does not take place.

Thus, fixed values of the threshold values Thx and Thy may not result in the direction of scroll as intended by the user, if the movement of the finger 230 is too slow or too fast. In order to ensure the direction of scroll as intended by the user, the threshold values Thx and Thy for scroll lock may be gradually varied in the middle of a drag operation.

Figure 10:
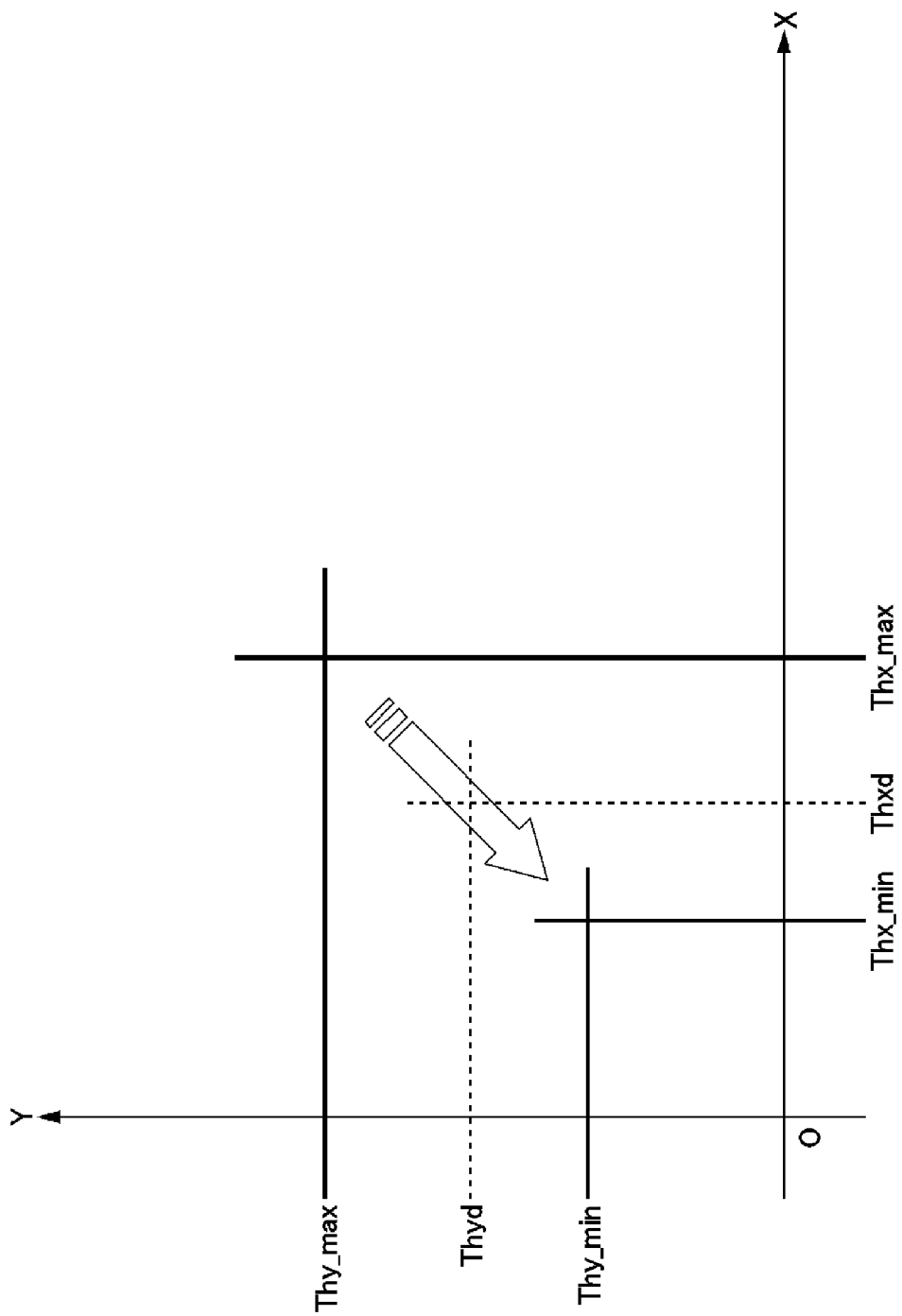
FIG. 10 shows automatic adjustment of threshold values for scroll lock.

FIG. 10 shows automatic adjustment of threshold values for scroll lock. A maximum threshold value Thx-max and a minimum threshold value Thx-min are defined for a default threshold value Thxd for scroll lock in the X-direction. Similarly, a maximum threshold value Thy-max and a minimum threshold value Thy-min are defined for a default threshold value Thyd for scroll lock in the Y-direction. The default threshold values Thxd and Thyd are respectively equal to the threshold values Thx and Thy, which are not made variable and are fixed.

The threshold value adjustment unit 20 gradually varies the threshold value Thx for scroll lock in the X-direction from the maximum threshold value Thx-max to the minimum threshold value Thx-min, and gradually varies threshold value Thy for scroll lock in the Y-direction from the maximum threshold value Thy-max to the minimum threshold value Thy-min.

Given that the sampling rate for sampling touch positions is 1/60 seconds, the threshold value is varied from the maximum threshold value to the minimum threshold value, defining a duration of 8 sampling periods (8 frames) as a time limit and defining a time period elapsed since the start of a drag operation until the time limit as a duration of variation. A default threshold value may be 1.2 mm. The maximum threshold value may be 1.68 mm, 40% higher than the default threshold value, and the minimum threshold value may be 0.72 mm, 40% lower than the default threshold value.

By automatically decreasing the threshold value for scroll lock from a value higher than the default value to a value lower than the threshold value, drag operations that are too slow or too quick described with reference to FIG. 9 can both be addressed.

Figure 11:
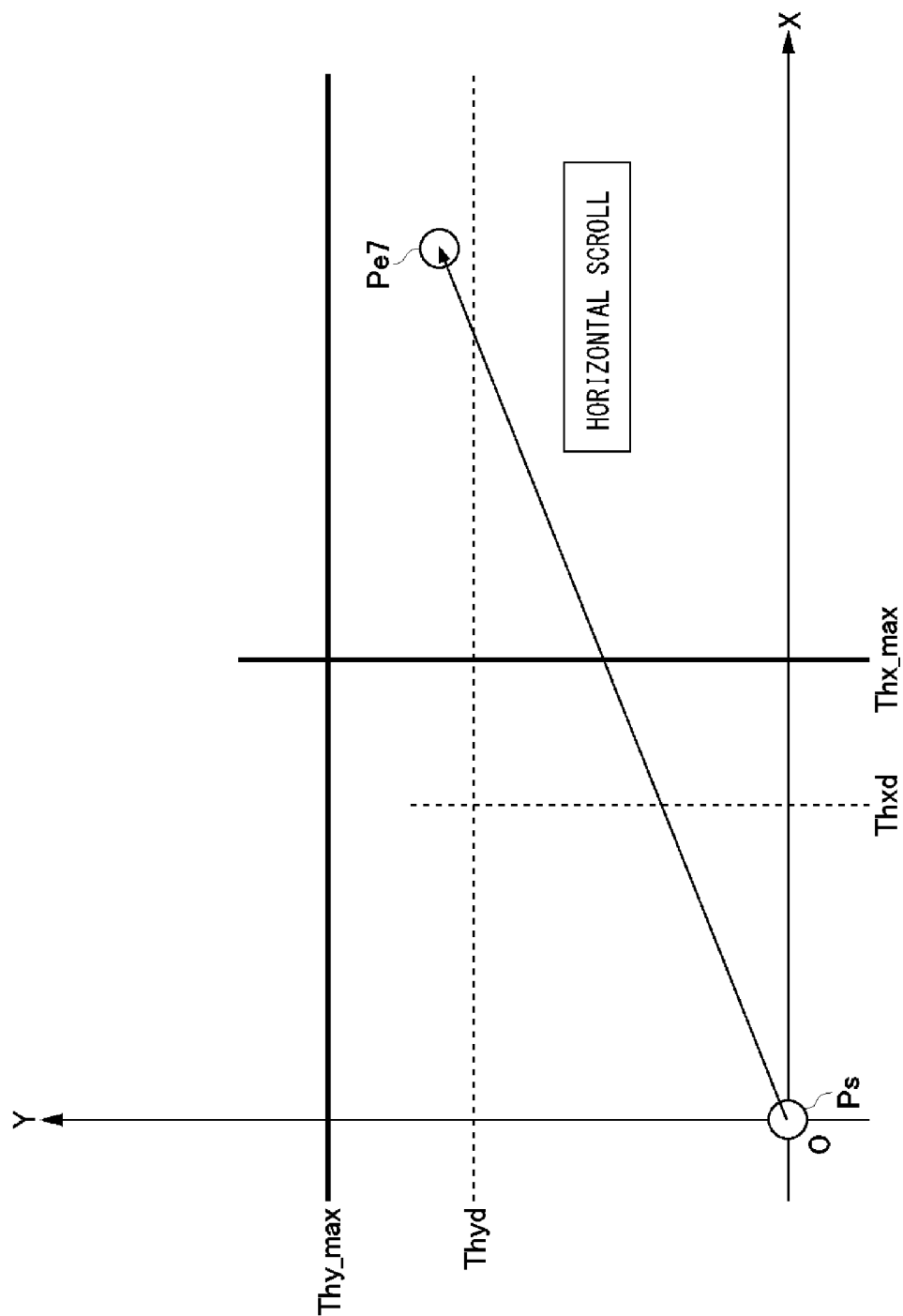
FIG. 11 shows how too quick a drag operation is related to the maximum threshold value for scroll lock.

FIG. 11 shows how too quick a drag operation is related to the maximum threshold value for scroll lock.

When the user's scroll operation is quick, the threshold value Thx for scroll lock in the X-direction will not be so drastically reduced from the maximum threshold value Thx-max and the threshold value Thy for scroll lock in the Y-direction will not be so drastically reduced from the maximum threshold value Thy-max at a point of time when the touch point is detected. Therefore, the Y-coordinate value of the touch point Pe1 occurring when the user drags the finger quickly for horizontal scroll will be less than the concurrent threshold value Thy for scroll lock in the Y-direction. Therefore, horizontal scroll results as intended. Two-dimensional scroll is avoided even if the user drags the finger quickly.

Figure 12:
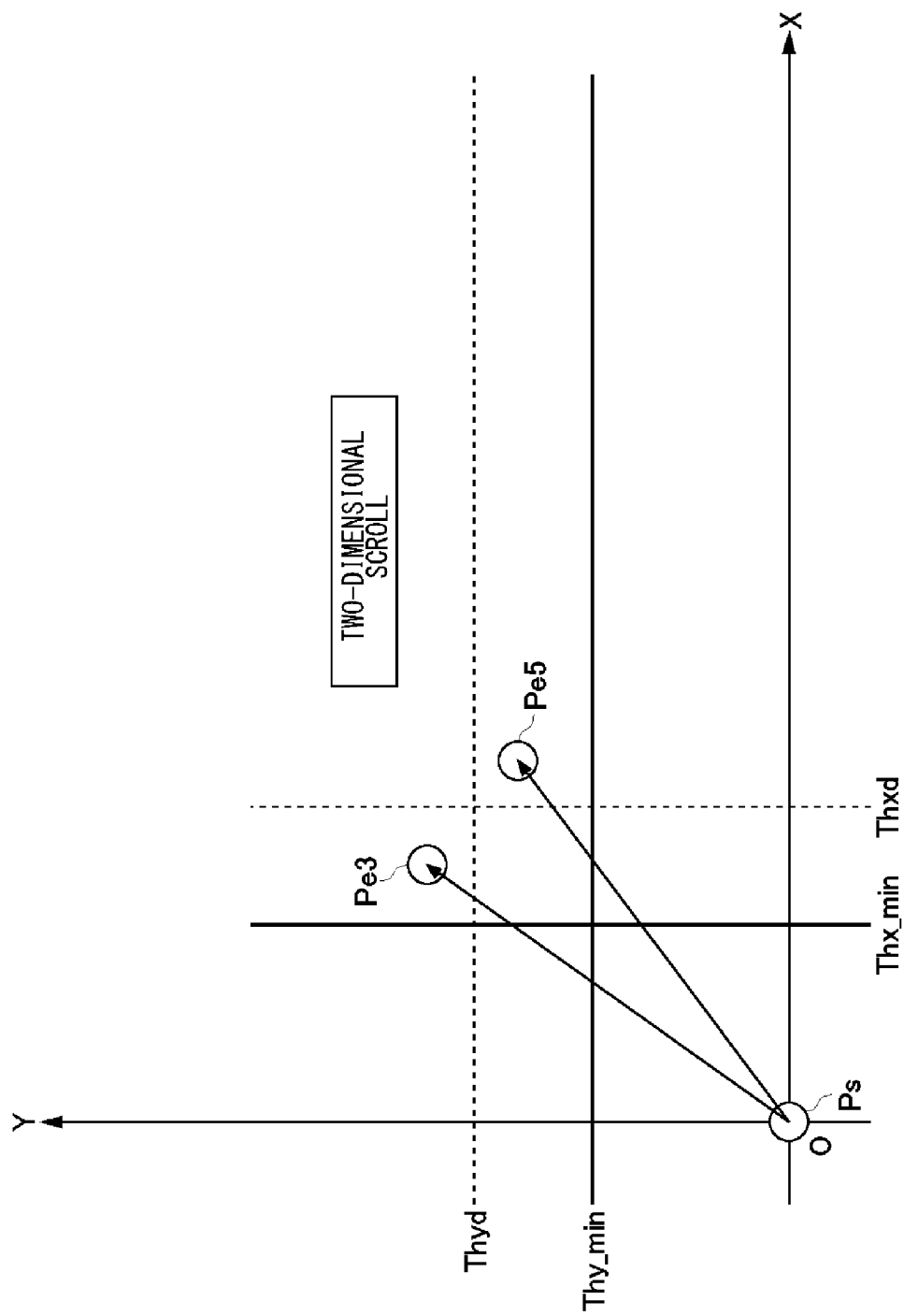
FIG. 12 shows how too slow a drag operation is related to the minimum threshold value for scroll lock.

FIG. 12 shows how too slow a drag operation is related to the minimum threshold value for scroll lock.

When the user's scroll operation is slow, the threshold value Thx for scroll lock in the X-direction approximates the minimum threshold value Thx-min and the threshold value Thy for scroll lock in the Y-direction approaches the minimum threshold value Thy-min at a point of time when the touch point is detected. Therefore, the X-coordinate value of the touch point Pe3 occurring when the user drags the finger slowly for two-dimensional scroll will be more than the concurrent threshold value Thx for scroll lock in the X-direction, and the Y-coordinate value of the touch point Pe5 will be more than the concurrent threshold value Thy for scroll lock in the Y-direction. Therefore, two-dimensional scroll as intended results both in the case of Pe3 and Pe5. Horizontal scroll or vertical scroll is avoided even if the user drags the finger slowly.

Figure 13:
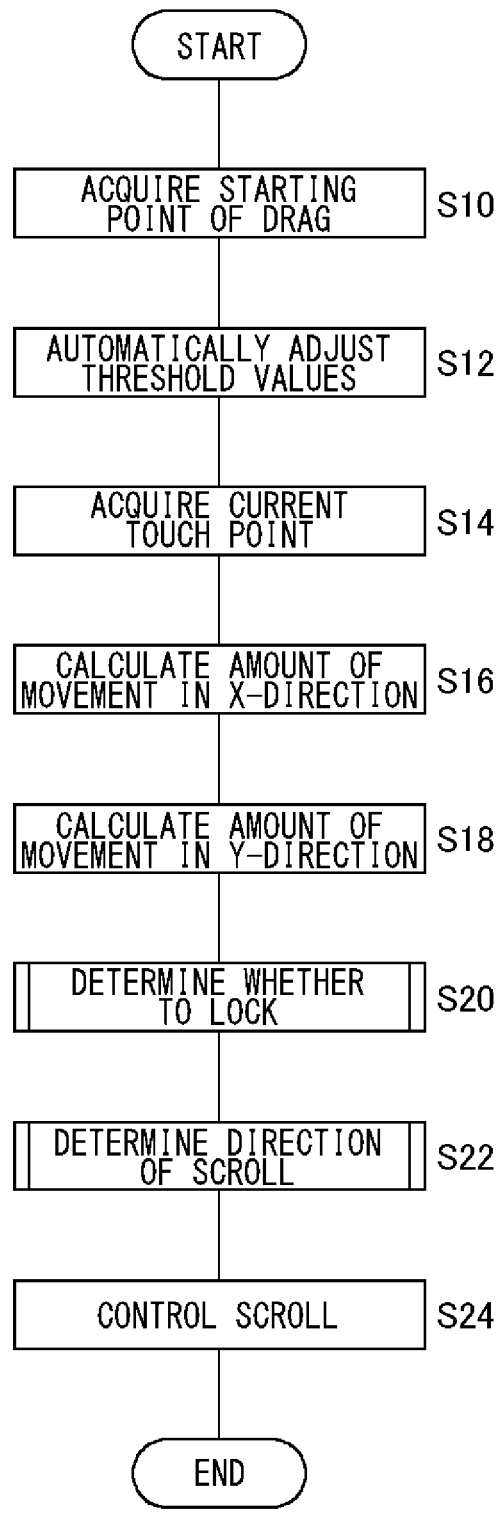
FIG. 13 is a flowchart showing the steps for scroll control by the scroll control device according to the first embodiment.

FIG. 13 is a flowchart showing the steps for scroll control by the scroll control device 100 according to the first embodiment.

The touch position acquisition unit 10 detects the starting point Ps of a drag operation (S10). The threshold value adjustment unit 20 starts automatic adjustment of the threshold values Thx and Thy for scroll lock in the X-direction and the Y-direction (S12).

Subsequently, the threshold value adjustment unit 20 varies the threshold values for scroll lock in steps in accordance with the sampling period for sampling touch positions by the touch position acquisition unit 10. The touch position acquisition unit 10 detects a touch point Pe(X(t), Y(t)) at current time t during a drag operation in the coordinate system with the starting point Ps as the point of origin (S14).

The X-direction movement amount acquisition unit 22 calculates an X-direction movement amount $\Delta X(t)$ by identifying a difference between the X-coordinate value of a touch point at a previous point of time and the X-coordinate value X(t) of a touch point at current time t (S16). The Y-direction movement amount acquisition unit 24 calculates a Y-direction movement amount $\Delta Y(t)$ by identifying a difference between the Y-coordinate value of a touch point at a previous point of time and the Y-coordinate value Y(t) of a touch point at current time t (S18).

The X-direction lock determination unit 32 and the Y-direction lock determination unit 34 determine whether to lock scroll in the X-direction and the Y-direction, respectively, by comparing the X-coordinate value X(t) and the Y-coordinate value Y(t) of a touch point at time t with the automatically adjusted threshold values Thx and Thy at time t, respectively (S20).

The scroll direction determination unit 30 determines the direction of scroll based on the lock/unlock of scroll in the X-direction and the Y-direction (S22). The scroll control unit 40 scrolls the screen in the scroll direction determined by the scroll direction determination unit 30 (S24). When it is determined that the screen should be scrolled horizontally, the screen is scrolled horizontally by a scroll amount determined by the movement amount $\Delta X(t)$ in the X-direction at time t. When it is determined that the screen should be scrolled vertically, the screen is scrolled vertically by a scroll amount determined by the movement amount $\Delta Y(t)$ in the Y-direction at time t.

Figure 14:
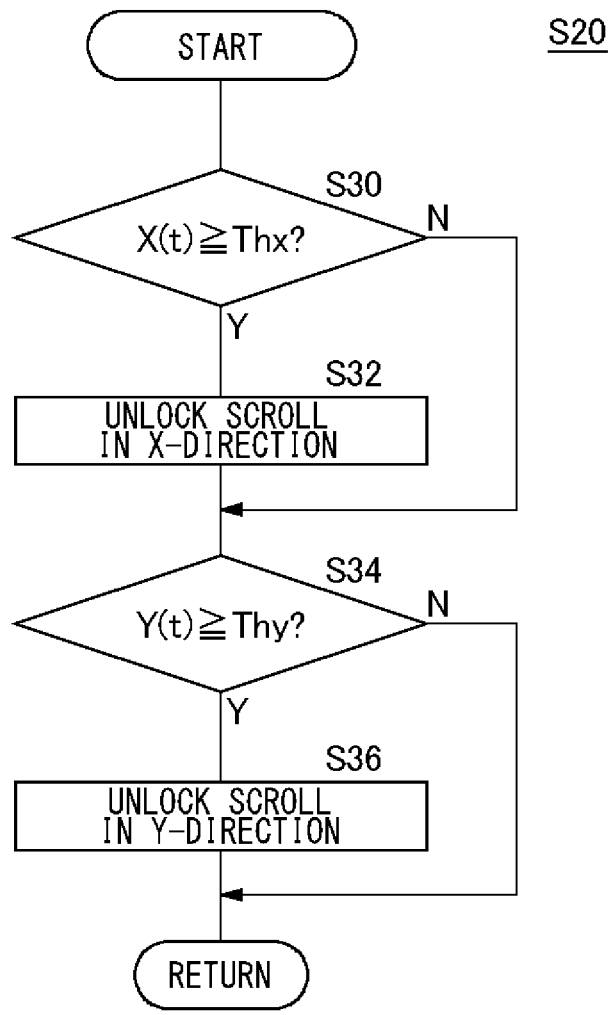
FIG. 14 is a flowchart showing the unlock determination process of FIG. 13 in further detail.

FIG. 14 is a flowchart showing the lock determination process in step S20 of FIG. 13 in further detail.

When the drag operation starts, scroll is locked both in the X-direction and the Y-direction.

The X-direction lock determination unit 32 determines whether the X-coordinate value X(t) of a touch point at time t is equal to or more than the threshold value Thx for scroll lock in the X-direction (S30). When the threshold value Thx for scroll lock in the X-direction is a fixed value, the value subject to determination is the default threshold value Thxd. When the threshold value is variable, the value subject to determination is the automatically adjusted threshold value Thx(t) at time t.

If $X(t) \geq Thx$ (Y in S30), the X-direction lock determination unit 32 releases (unlocks) scroll lock in the X-direction (S32). If not (N in S30), the X-direction lock determination unit 32 maintains the locked state of scroll in the X-direction.

Subsequently, the Y-direction lock determination unit 34 similarly determines whether the Y-coordinate value Y(t) of a touch point at time t is equal to or more than the threshold value Thy for scroll lock in the Y-direction (S34). If $Y(t) \geq Thy$ (Y in S34), the Y-direction lock determination unit 34 releases (unlocks) scroll lock in the Y-direction (S36). If not (N in S34), the Y-direction lock determination unit 34 maintains the locked state of scroll in the Y-direction.

Figure 15:
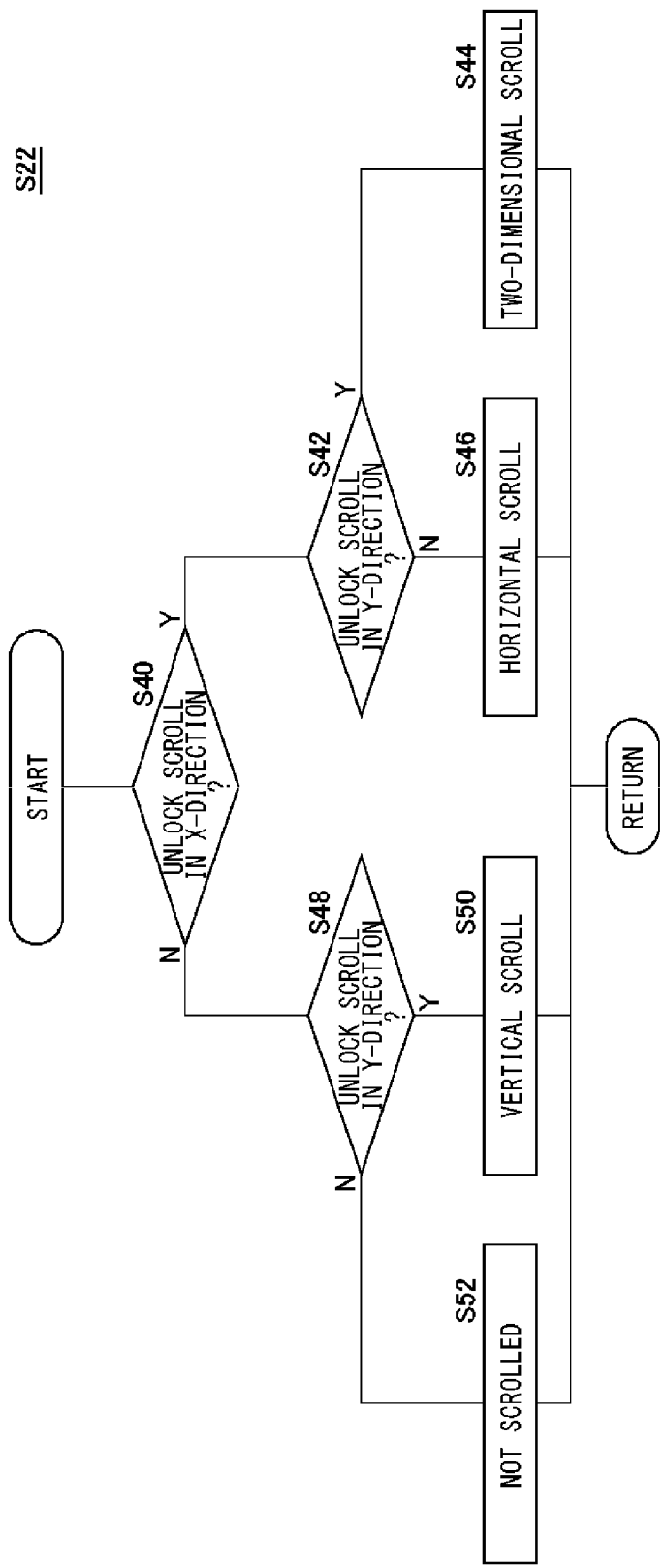
FIG. 15 is a flowchart showing the scroll direction determination process of FIG. 13 in further detail.

FIG. 15 is a flowchart showing the scroll direction determination process of step S22 of FIG. 13 in further detail.

The scroll direction determination unit 30 examines whether scroll in the X-direction is unlocked (S40). If scroll in the X-direction is unlocked (Y in S40), the scroll direction determination unit 30 further determines whether scroll in the Y-direction is unlocked (S42). If scroll in the Y-direction is also unlocked (Y in S42), the scroll direction determination unit 30 determines that the screen should be scrolled two-dimensionally (S44). If scroll in the Y-direction is locked (N in S42), the scroll direction determination unit 30 determines that the screen should be scrolled horizontally (S46).

If it is determined in step S40 that scroll in the X-direction is not unlocked, i.e., is locked (N in S40), the scroll direction determination unit 30 further determines whether scroll in the Y-direction is unlocked (S48). If scroll in the Y-direction is unlocked (Y in S48), the scroll direction determination unit 30 determines that the screen should be scrolled vertically (S50). If scroll in the Y-direction is not unlocked, either, i.e., is locked (N in S48), the scroll direction determination unit 30 determines that the screen should not be scrolled (S52).

Second Embodiment

The second embodiment differs from the first embodiment in respect of some aspects of the configuration and operation of the scroll control device 100. The description below highlights the difference from the first embodiment and a description of the aspects of the configuration and operation identical to those of the first embodiment will be omitted.

Figure 16:
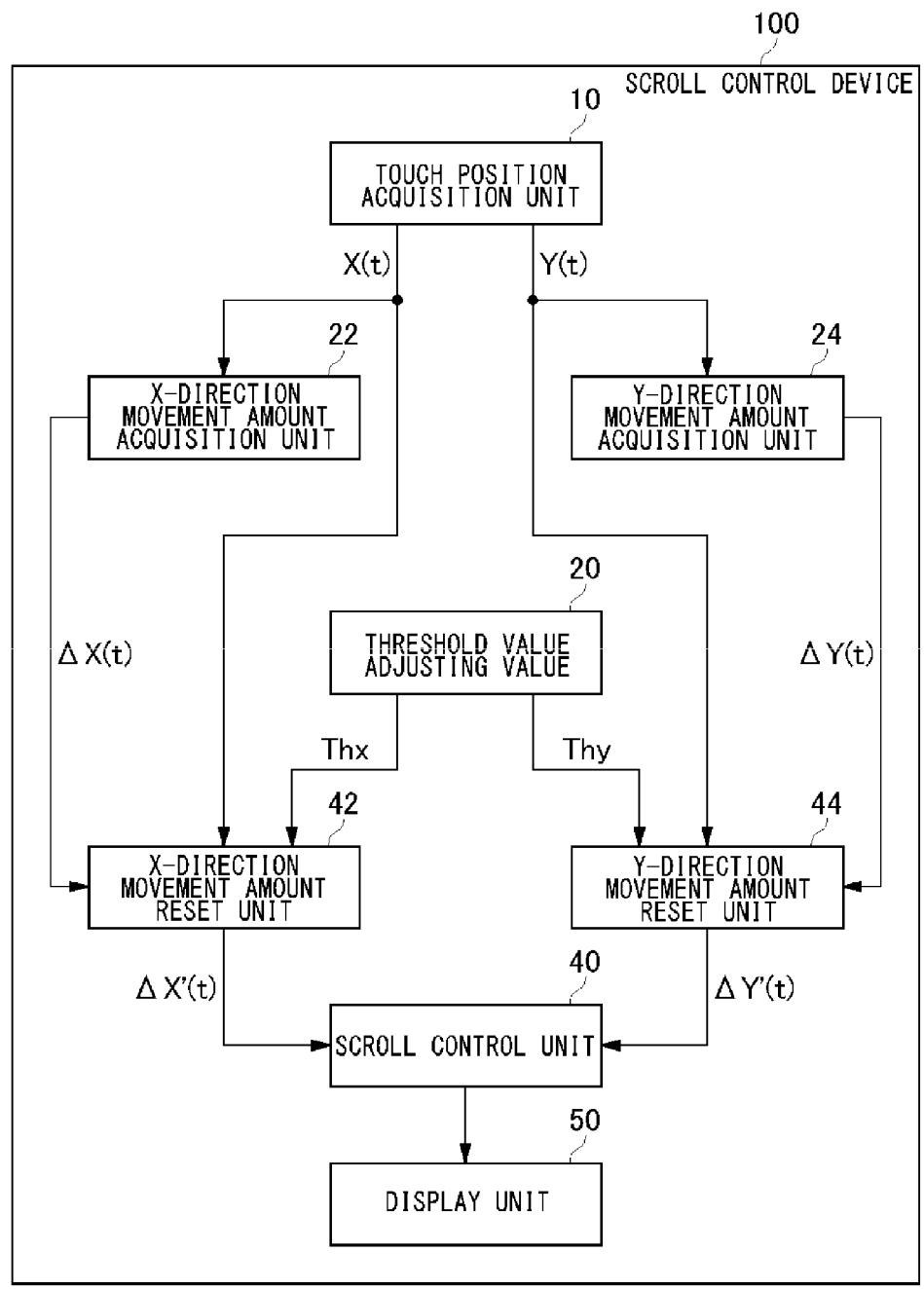
FIG. 16 shows the configuration of the scroll control device according to the second embodiment.

FIG. 16 shows the configuration of the scroll control device 100 according to the second embodiment. The scroll control device 100 is provided with a touch position acquisition unit 10, a threshold value adjustment unit 20, an X-direction movement amount acquisition unit 22, a Y-direction movement amount acquisition unit 24, an X-direction movement amount reset unit 42, a Y-direction movement amount reset unit 44, a scroll control unit 40, and a display unit 50.

The operation of the touch position acquisition unit 10, the threshold value adjusting unit 20, the X-direction movement amount acquisition unit 22, and the Y-direction movement amount acquisition unit 24 is the same as that of the first embodiment. However, the second embodiment differs from the first embodiment in the destination of values as determined. In the second embodiment, touch position acquisition unit 10 supplies the X-coordinate value X(t) of a touch point at current time t to the X-direction movement amount acquisition unit 22 and the X-direction movement amount reset unit 42, and supplies the Y-coordinate value Y(t) of the touch point at current time t to the y-direction movement amount acquisition unit 24 and the Y-direction movement amount reset unit 44. The threshold value adjustment unit 20 supplies the automatically adjusted threshold values Thx and Thy to the X-direction movement amount reset unit 42 and the Y-direction movement amount reset unit 44, respectively.

The X-direction movement amount acquisition unit 22 does not supply the movement amount ΔX(t) in the X-direction at current time t to the scroll control unit 40 but to the X-direction movement amount reset unit 42. The Y-direction movement amount acquisition unit 24 does not supply the movement amount ΔY(t) in the Y-direction at current time t to the scroll control unit 40 but to the Y-direction movement amount reset unit 44.

When the X-direction coordinate value X(t) of a touch point at time t is less than the threshold value Thx, the X-direction movement amount reset unit 42 resets the movement amount ΔX(t) in the X-direction at time t to zero. When the X-coordinate value X(t) of a touch point at time t exceeds the threshold value Thx, the X-direction movement amount reset 42 does not reset and maintains the movement amount ΔX(t) in the X-direction at time t. Denoting the movement amount in the X-direction processed by the X-direction movement amount reset unit 42 (referred to as post-adjustment movement amount) as ΔX'(t), ΔX'(t)=0 or ΔX'(t)=ΔX(t).

Similarly, when the Y-direction coordinate value Y(t) of a touch point at time t is less than the threshold value Thy, the Y-direction movement amount reset unit 44 resets the movement amount ΔY(t) in the Y-direction at time t to zero. When the Y-coordinate value Y(t) of a touch point at time t exceeds the threshold value Thy, the Y-direction movement amount reset 44 does not reset and maintains the movement amount ΔY(t) in the Y-direction at time t. Denoting the movement amount in the Y-direction processed by the Y-direction movement amount reset unit 44 (referred to as post-adjustment movement amount) as ΔY'(t), ΔY'(t)=0 or ΔY'(t)=ΔY(t).

The scroll control unit 40 receives the post-adjustment movement amount ΔX'(t) in the X-direction at time t from the X-direction movement amount reset unit 42 and receives the post-adjustment movement amount ΔY'(t) in the Y-direction at time t from the Y-direction movement amount reset unit 44. The scroll control unit 40 scrolls the screen in a vector direction determined by the post-adjustment movement amount ΔX'(t) in the X-direction and the post-adjustment movement amount ΔY'(t) in the Y-direction. More specifically, the scroll control unit 40 scrolls the screen horizontally by a scroll amount determined by (e.g., proportional to) the post-adjustment movement amount ΔX'(t) in the X-direction, and vertically by a scroll amount determined by (e.g., proportional to) the post-adjustment movement amount ΔY'(t) in the Y-direction. In other words, the scroll control unit 40 scrolls the screen in a direction determine by a movement vector (ΔX'(t), ΔY'(t)) by a scroll amount determined by (e.g., proportional to) the magnitude of the movement vector.

When ΔX'(t)=ΔX(t) and ΔY'(t)=0, the screen is not scrolled in the Y-direction and scrolled horizontally, i.e., in the X-direction, by a scroll amount proportional to ΔX(t). When ΔX'(t)=0 and ΔY'(t)=ΔY(t), the screen is not scrolled in the X-direction and scrolled vertically, i.e., in the Y-direction, by a scroll amount proportional to ΔY(t). When ΔX'(t)=ΔX(t) and ΔY'(t)=ΔY(t), the screen is scrolled in the X-direction by a scroll amount proportional to ΔX(t) and scrolled in the Y-direction by a scroll amount proportional to ΔY(t). In other words, the screen is scrolled two-dimensionally. When ΔX'(t)=0 and ΔY'(t)=0, the screen is not scrolled in either direction.

Thus, according to the second embodiment, the movement amount in the X-direction or the movement amount in the Y-direction is reset to zero so that scroll in the X-direction or the Y-direction is virtually locked, thereby achieving vertical scroll or horizontal scroll.

Figure 17:
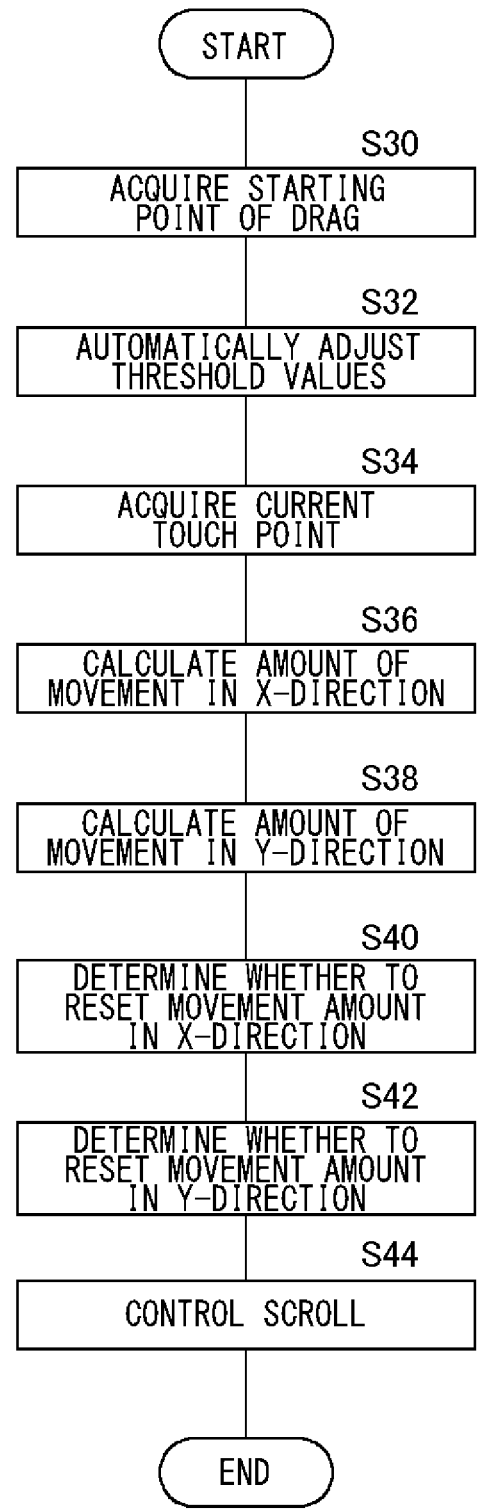
FIG. 17 is a flowchart showing the steps for scroll control by the scroll control device according to the second embodiment.

FIG. 17 is a flowchart showing the steps for scroll control by the scroll control device 100 according to the second embodiment.

The touch position acquisition unit 10 detects the starting point Ps of a drag operation (S30). The threshold value adjustment unit 20 starts automatic adjustment of the threshold values Thx and Thy for scroll lock in the X-direction and the Y-direction (S32). Subsequently, the threshold value adjustment unit 20 varies the threshold values for scroll lock in steps in accordance with the sampling period for sampling touch positions by the touch position acquisition unit 10. The touch position acquisition unit 10 detects a touch point Pe(X(t), Y(t)) at current time t during a drag operation in the coordinate system with the starting point Ps as the point of origin (S34).

The X-direction movement amount acquisition unit 22 calculates an X-direction movement amount ΔX(t) by identifying a difference between the X-coordinate value of a touch point at a previous point of time and the X-coordinate value X(t) of a touch point at current time t (S36). The Y-direction movement amount acquisition unit 24 calculates a Y-direction movement amount ΔY(t) by identifying a difference between the Y-coordinate value of a touch point at a previous point of time and the Y-coordinate value Y(t) of a touch point at current time t (S38).

The X-direction movement amount reset unit 42 determines whether to reset the movement amount ΔX(t) in the X-direction at time t to zero by comparing the X-coordinate value X(t) at a touch point at time t with the automatically adjusted threshold value Thx at time t (S40). When X(t)<Thx, the X-direction movement amount reset unit 42 resets the movement amount such that ΔX(t)=0. When X(t)≥Thx, the X-direction movement amount reset unit 42 does not reset ΔX(t) and maintains it unchanged from the value determined by the X-direction movement amount acquisition unit 22.

Similarly, The Y-direction movement amount reset unit 44 determines whether to reset the movement amount ΔY(t) in the Y-direction at time t to zero by comparing the Y-coordinate value Y(t) at a touch point at time t with the automatically adjusted threshold value Thy at time t (S42). When Y(t)<Thy, the Y-direction movement amount reset unit 44 resets the movement amount such that $\Delta Y(t)=0$. When $Y(t) \geq Thy$, the Y-direction movement amount reset unit 44 does not reset $\Delta Y(t)$ and maintains it unchanged from the value determined by the Y-direction movement amount acquisition unit 24.

The scroll control unit 40 scrolls the screen in a direction of a movement vector $(\Delta X(t), \Delta Y(t))$ determined by the movement amount $\Delta X$ in the X-direction at time t as adjusted by the X-direction movement amount reset unit 42 and the movement amount $\Delta Y(t)$ in the Y-direction at time t as adjusted by the Y-direction movement amount reset unit 44, and by a scroll amount determined by the length of the movement vector (S44). When $\Delta X(t)$ or $\Delta Y(t)$ is reset to zero, the movement vector will be a vertical vector or a horizontal vector so that vertical scroll or horizontal scroll takes place.

Third Embodiment

The third embodiment differs from the first embodiment in respect of some aspects of the configuration and operation of the scroll control device 100. The description below highlights the difference from the first embodiment and a description of the aspects of the configuration and operation identical to those of the first embodiment will be omitted.

Figure 18:
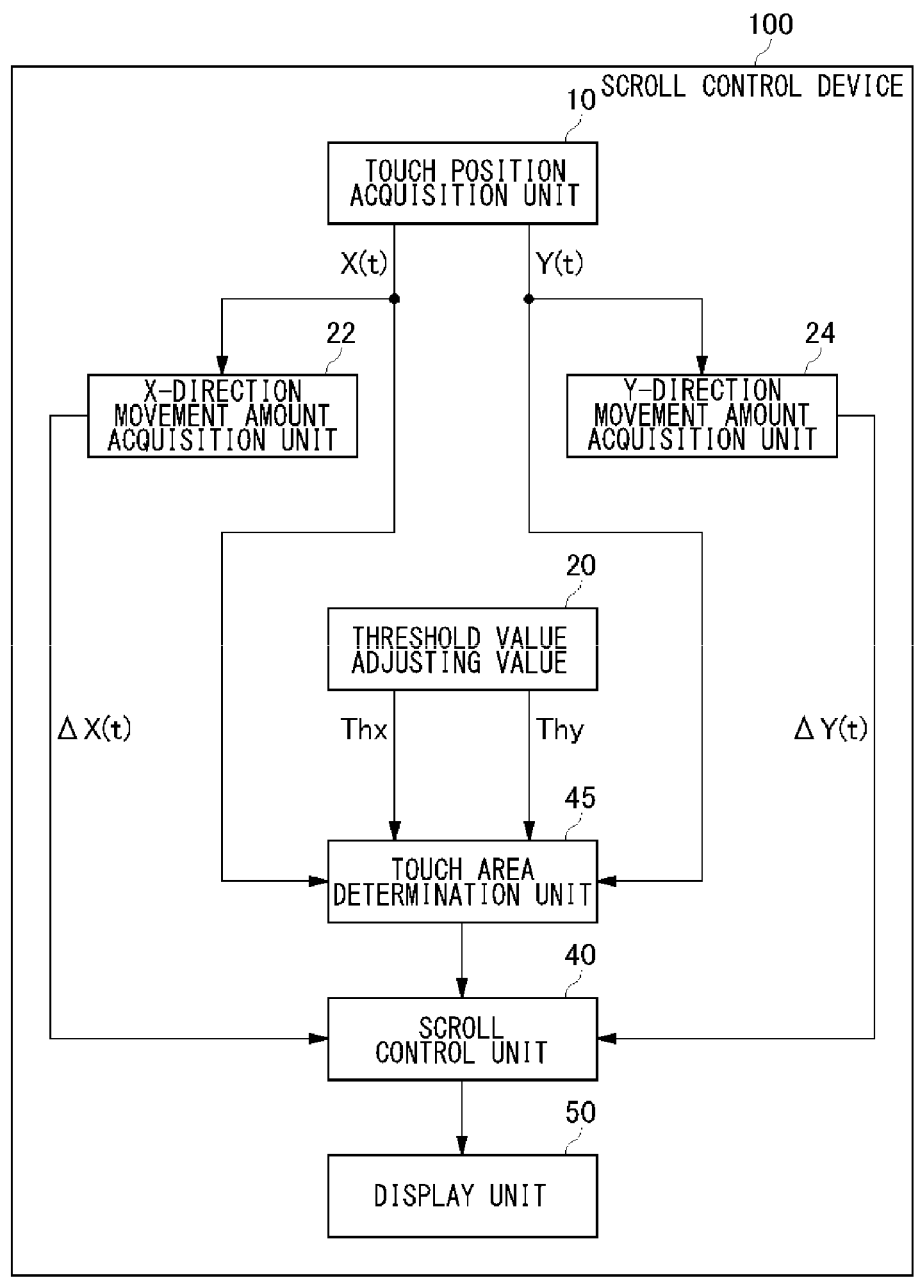
FIG. 18 shows the configuration of the scroll control device according to the third embodiment.

FIG. 18 shows the configuration of the scroll control device 100 according to the third embodiment. The scroll control device 100 is provided with a touch position acquisition unit 10, a threshold value adjustment unit 20, an X-direction movement amount acquisition unit 22, a Y-direction movement amount acquisition unit 24, a scroll control unit 40, a touch area determination unit 45, and a display unit 50.

The operation of the touch position acquisition unit 10, the threshold value adjusting unit 20, the X-direction movement amount acquisition unit 22, and the Y-direction movement amount acquisition unit 24 is the same as that of the first embodiment. However, the third embodiment differs from the first embodiment in the destination of values as determined by the touch position acquisition unit 10 and the threshold value adjusting unit 20. In the third embodiment, the touch position acquisition unit 10 supplies the X-coordinate value $X(t)$ of a touch point at current time t to the X-direction movement amount acquisition unit 22 and the touch area determination unit 45, and supplies the Y-coordinate value $Y(t)$ of the touch point at current time t to the y-direction movement amount acquisition unit 24 and the touch area determination unit 45. The threshold value adjustment unit 20 supplies the automatically adjusted threshold values Thx and Thy to the touch area determination unit 45.

As in the first embodiment, the X-direction movement amount acquisition unit 22 supplies the scroll control unit 40 with an X-direction movement amount $\Delta X(t)$ at current time t, and the Y-direction movement amount acquisition unit 24 supplies the scroll control unit 40 with a Y-direction movement amount $\Delta Y(t)$ at current time t.

The touch area determination unit 45 determines which segments inside or outside the insensitive area 240, which is defined by the threshold values Thx and Thy, the touch point $(X(t), Y(t))$ at time t is located.

Figure 19:
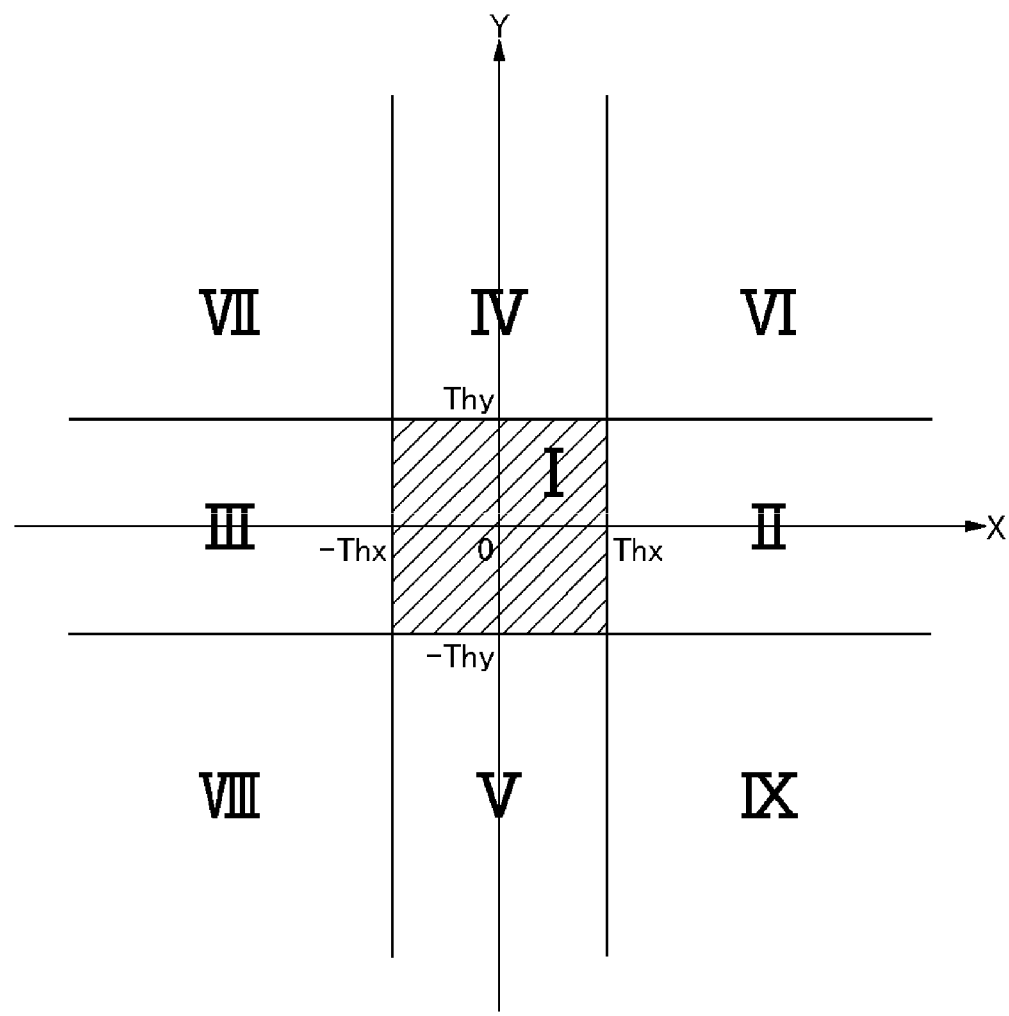
FIG. 19 shows 9 segments determined by the threshold value in the horizontal direction and the threshold value in the vertical direction around a point where the touch starts.

FIG. 19 shows 9 segments determined by the threshold value Thx in the horizontal direction and the threshold value Thy in the vertical direction around a point where the touch starts.

In the XY-coordinate system around the point where the touch starts, segment I is an area in which $-Thx < X < Thx$ and $-Thy < Y < Thy$ are met and is located in the insensitive area 240. When the current touch point is located in segment I, the screen is not scrolled in the X-direction or Y-direction.

Segment II is an area in which $Thx \leq X$ and $-Thy < Y < Thy$ are met, and segment III is an area in which $X \leq -Thx$ and $-Thy < Y < Thy$ are met. When the touch point reaches segment II or segment III, horizontal scroll takes place.

Segment IV is an area in which $-Thx < X < Thx$ and $Thy \leq Y$ are met, and segment V is an area in which $-Thx < X < Thx$ and $Y \leq -Thy$ are met. When the touch point reaches segment IV or segment V, vertical scroll takes place.

Segment VI is an area in which $Thx \leq X$ and $Thy \leq Y$ are met, and segment VII is an area in which $X \leq -Thx$ and $Thy \leq Y$ are met, segment VIII is an area in which $X \leq -Thx$ and $Y \leq -Thy$ are met, and segment IV is an area in which $Thx \leq X$ and $Y \leq -Thy$ are met. When the touch point reaches any of segments Vi, VII, VIII, and IX, two-dimensional scroll takes place.

The touch area determination unit 45 determines which of the 9 segments I-IX of FIG. 19 the touch point $(X(t), Y(t))$ at time t is located. Determination of an area is done by comparing the X-coordinate value $X(t)$ and the Y-coordinate value $Y(t)$ of the touch point with the respective threshold values Thx and Thy.

The scroll control unit 40 is notified by the touch area determination unit 45 of a segment in which the touch point at current time t is located. When the current touch point is located in segment I, the scroll control unit 40 does not scroll the screen in any direction. When the current touch point is located in segment II or III, the scroll control unit 40 scrolls the screen in the horizontal direction. When the current touch point is located in segment IV or V, the scroll control unit 40 scrolls the screen in the vertical direction. When the current touch point is located in any of segments VI, VII, VIII, and IX, the scroll control unit 40 scrolls the screen two-dimensionally.

In horizontal scroll, the scroll control unit 40 scrolls the screen horizontally by a scroll amount determined by the movement amount $\Delta X(t)$ in the X-direction supplied from the X-direction movement amount acquisition unit 22. In vertical scroll, the scroll control unit 40 scrolls the screen vertically by a scroll amount determined by the movement amount $\Delta Y(t)$ in the Y-direction supplied from the Y-direction movement amount acquisition unit 24. In two-dimensional scroll, the scroll control unit 40 scrolls the screen horizontally by a scroll amount determined by the movement amount $\Delta X(t)$ in the X-direction and vertically by a scroll amount determined by the movement amount $\Delta Y(t)$ in the Y-direction.

As in the scroll control device according to the second embodiment, the scroll control device 100 according to the third embodiment may also be provided with the X-direction movement amount reset unit 42 and Y-direction movement amount reset unit 44 so that, when the current touch point is located in segment II or III, the Y-direction movement amount reset unit 44 resets the movement amount $\Delta Y(t)$ in the Y-direction supplied from the Y-direction movement amount acquisition unit 24 to zero, and, when the current touch point is located in segment IV or V, the X-direction movement amount reset unit 42 resets the movement amount $\Delta X(t)$ in the X-direction supplied from the X-direction movement amount acquisition unit 22 to zero.

Thus, according to the third embodiment, the screen can be scrolled vertically, horizontally, or two-dimensionally depending on the segment in which the current touch point is located.

A description will now be given of examples of horizontal scroll, vertical scroll, and two-dimensional scroll with reference to FIGS. 20-23C. The examples will be common to the first through third embodiments described above.

Figure 20:
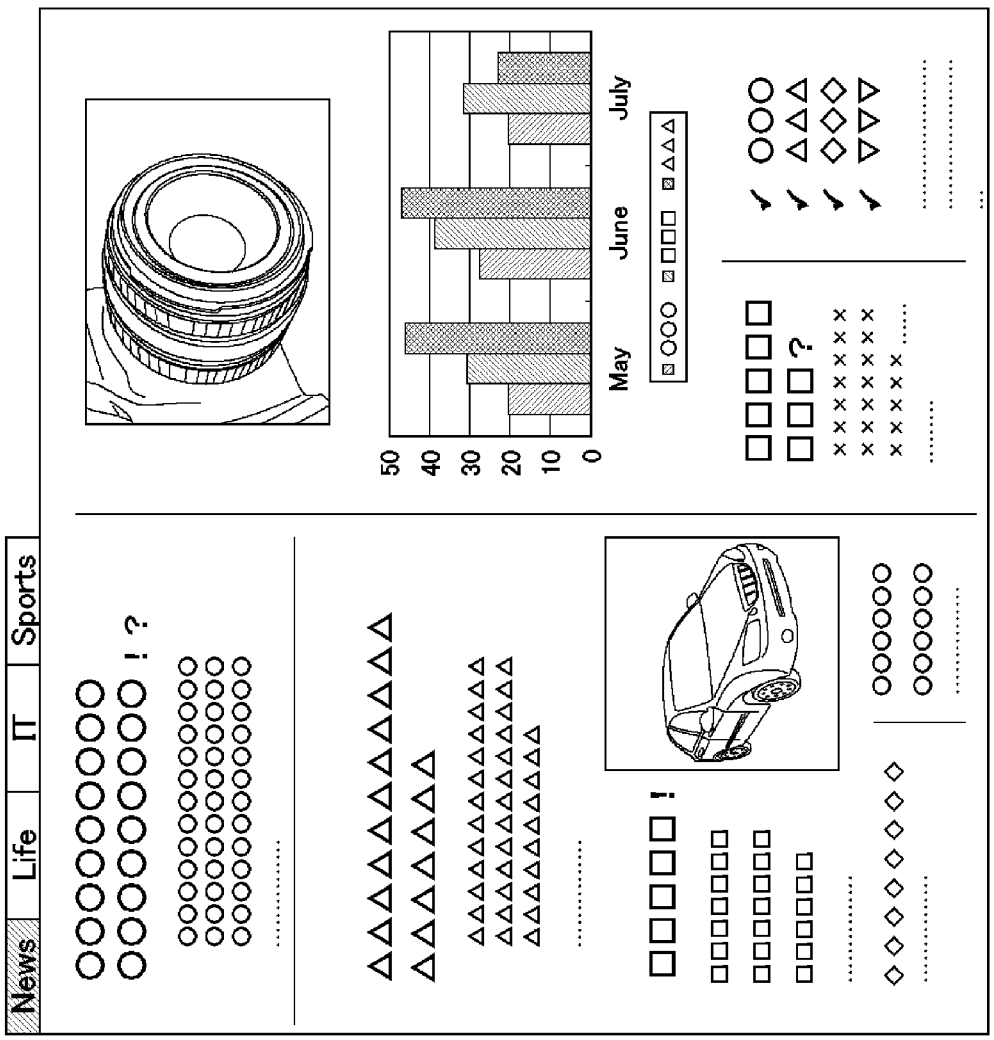
FIG. 20 shows an exemplary web page.

FIG. 20 shows an exemplary web page 300. The web page 300 largely comprises two areas, i.e., the left half area and the right half area. News articles, photos, graphs are shown in each of the areas.

When the display area of the touch screen 210 of the mobile terminal 200 is too small to display the entirety of the web page 300, the user browse the web page 300 by scrolling the screen horizontally, vertically, or two-dimensionally as appropriate.

Figure 21A:
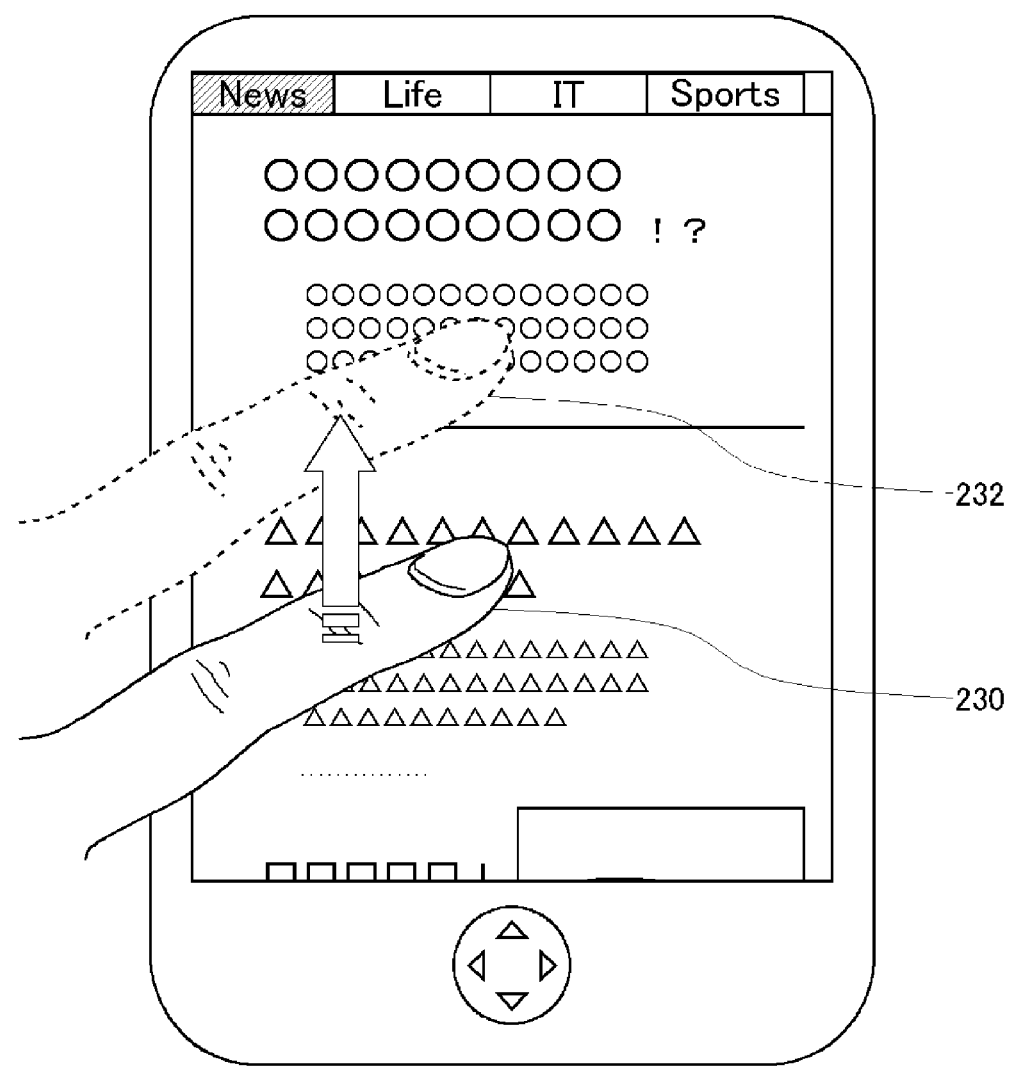
FIG. 21A shows an example of vertical scroll.
Figure 21B:
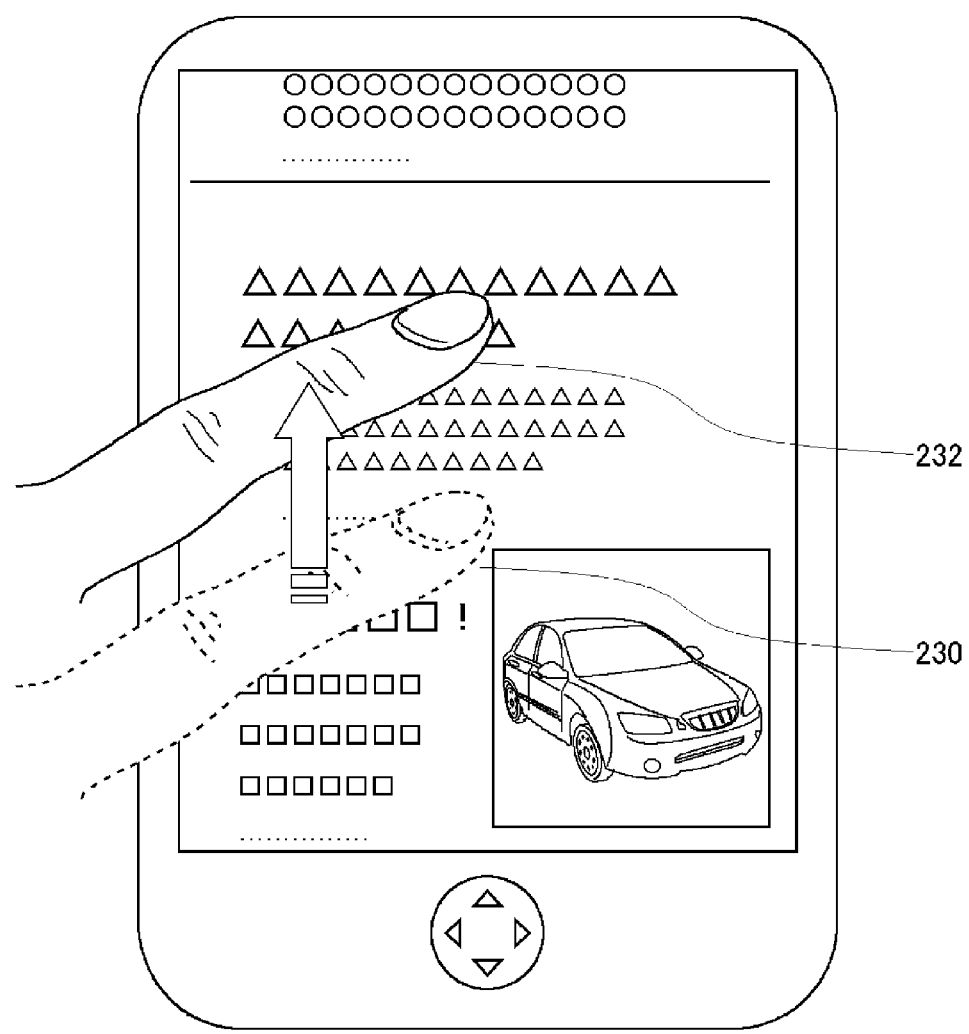
FIG. 21B shows an example of vertical scroll.

FIGS. 21A and 21B show examples of vertical scroll. FIG. 21A shows the top left area of the web page 300 on the touch screen 210 of the mobile terminal 200. The user attempts to scroll the web page 300 vertically by dragging the finger in contact with the touch screen 210 upward from a position indicated by a symbol 230 to a position indicated by a symbol 232. When the X-coordinate value of the touch point with reference to the point of origin defined at the starting point where the upward drag of the finger 230 starts is less than the threshold value Thx for scroll lock, scroll in the X-direction is locked. Only scroll in the Y-direction is unlocked so that the page is scrolled vertically. FIG. 21B shows the result of vertical scroll. The finger is moved to a position indicated by the symbol 232. The web page 300 is scrolled upward so that the lower part of the left half area of the web page 300 is viewable.

Figure 21C:
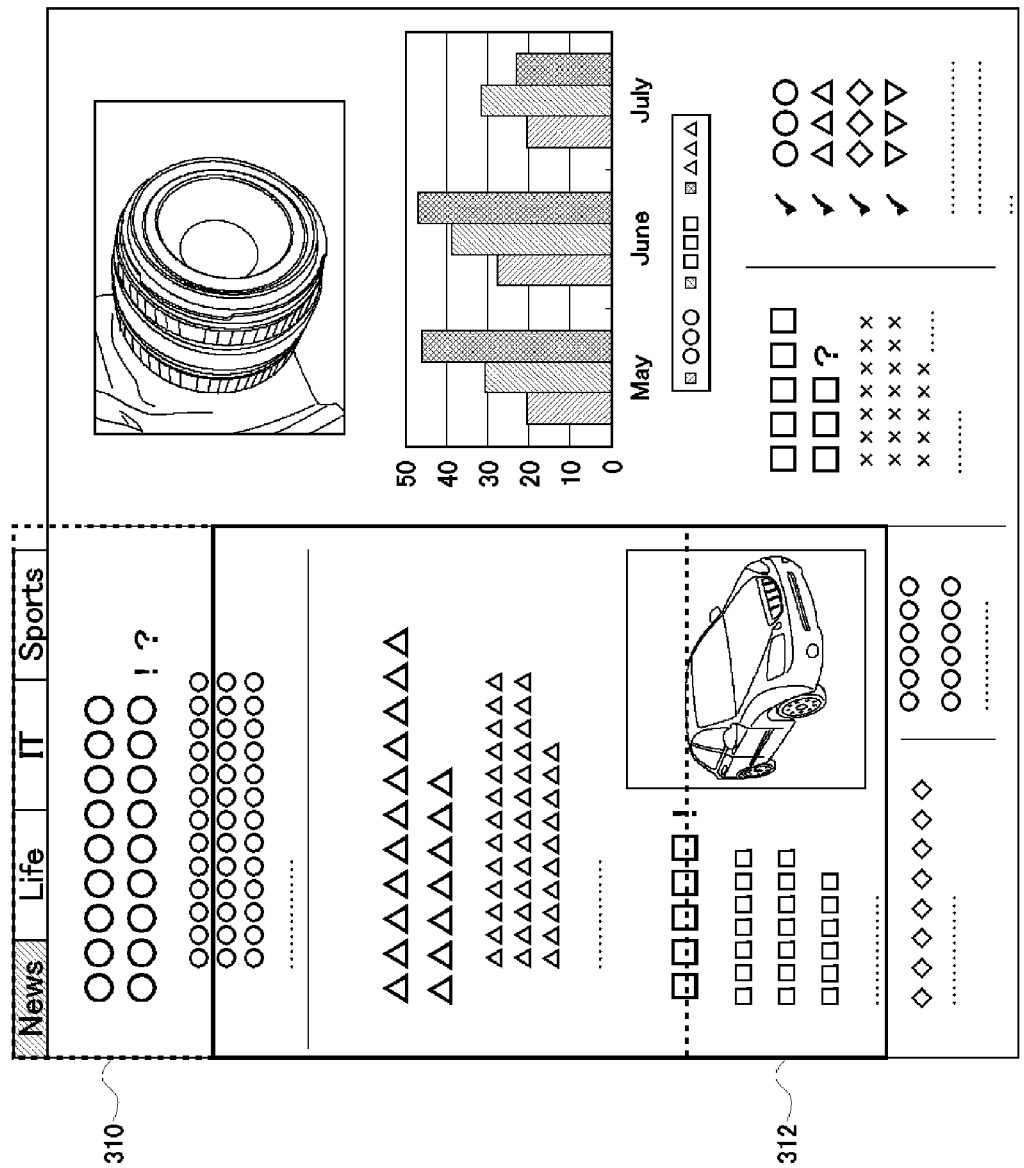
FIG. 21C shows how the display area of the touch screen is moved on the web page as a result of the vertical scroll.

FIG. 21C shows how the display area of the touch screen 210 is moved on the web page 300 as a result of the vertical scroll shown in FIGS. 21A and 21B. By dragging the page upward, the display area of the touch screen 210 is moved vertically from the area (symbol 310) bounded by broken lines to the area (symbol 312) bounded by solid lines. Since scroll is locked in the X-direction, the display area is not moved in the X-axis direction. This allows the user to scroll the web page 300 only in the vertical direction to display a desired area on the screen without frustration.

Figure 22A:
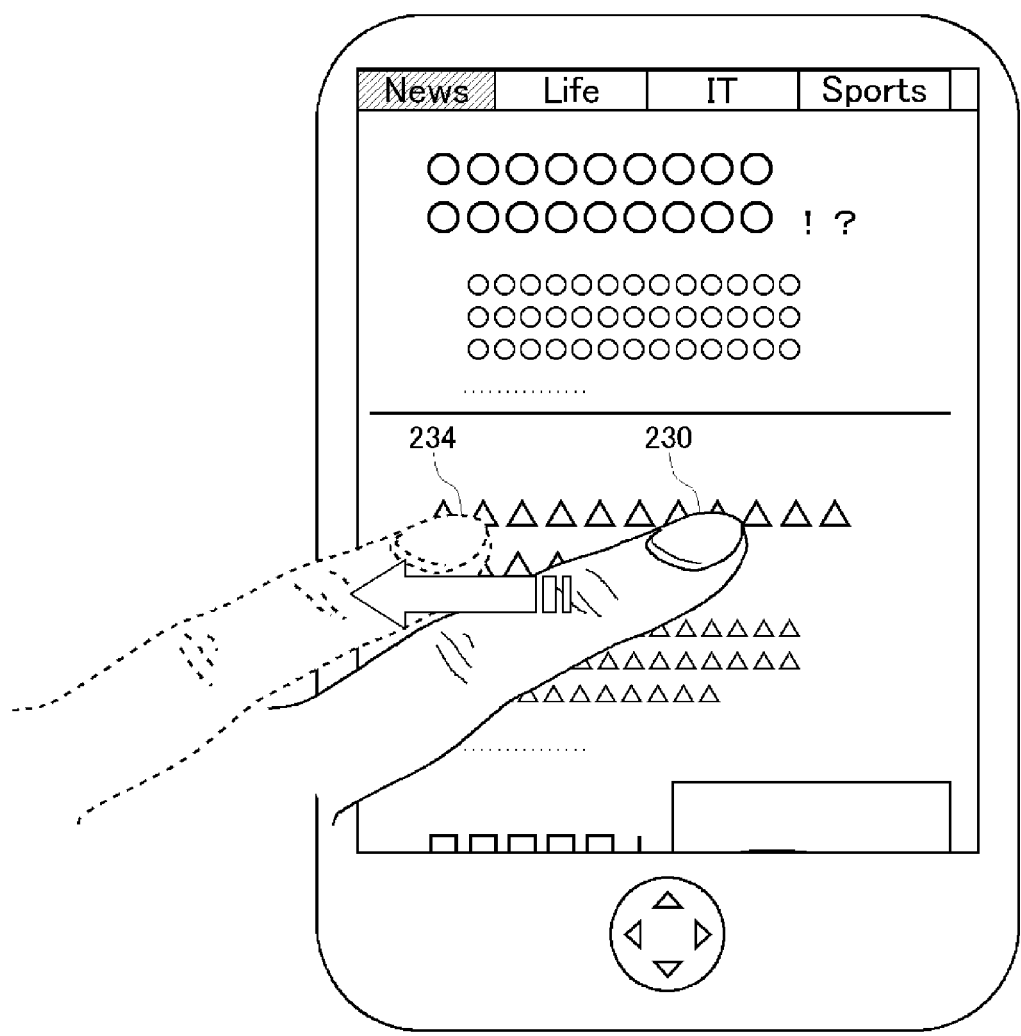
FIG. 22A shows an example of horizontal scroll.
Figure 22B:
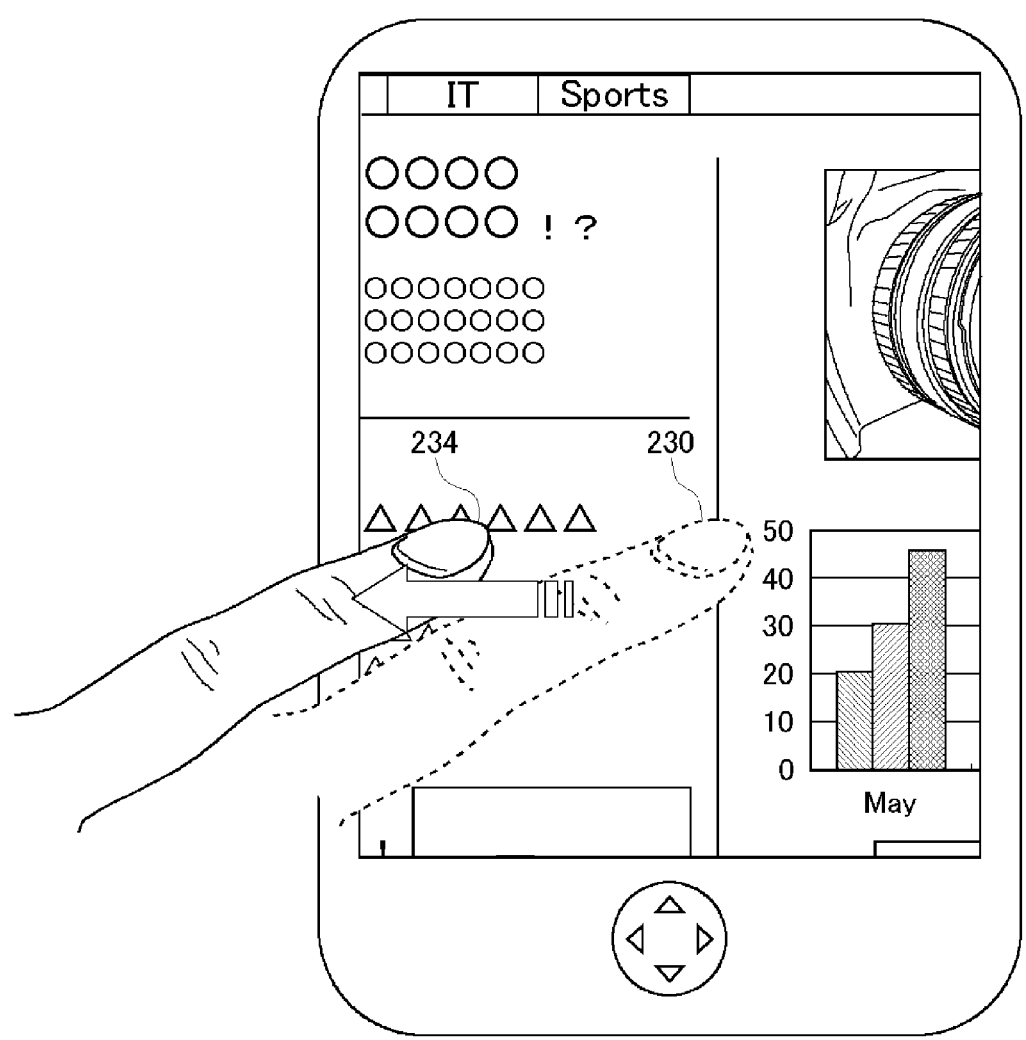
FIG. 22B shows an example of horizontal scroll.

FIGS. 22A and 22B show examples of horizontal scroll. FIG. 22A shows the top left area of the web page 300 on the touch screen 210 of the mobile terminal 200. The user attempts to scroll the web page 300 horizontally by dragging the finger in contact with the touch screen 210 leftward from a position indicated by the symbol 230 to a position indicated by a symbol 234. When the Y-coordinate value of the touch point with reference to the point of origin defined at the starting point where the leftward drag of the finger 230 starts is less than the threshold value Thy for scroll lock, scroll in the Y-direction is locked. Only scroll in the X-direction is unlocked so that the page is scrolled horizontally. FIG. 22B shows the result of horizontal scroll. The finger is moved to a position indicated by the symbol 234. The web page 300 is scrolled leftward so that a part of the right half area of the web page 300 begins to be viewable. As the user repeats leftward dragging, the right half area of the web page 300 becomes viewable.

Figure 22C:
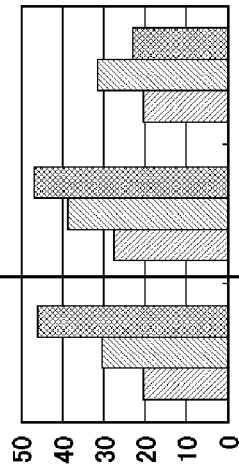
FIG. 22C shows how the display area of the touch screen is moved on the web page as a result of the horizontal scroll shown.
Figure 22C:
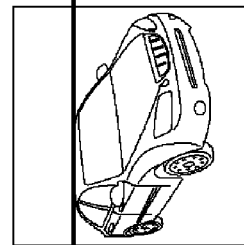
Figure 22C:
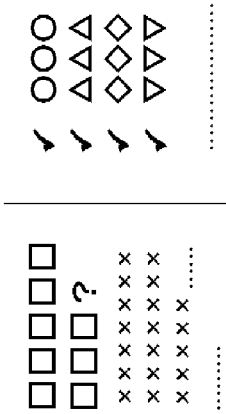

FIG. 22C shows how the display area of the touch screen 210 is moved on the web page 300 as a result of the horizontal scroll shown in FIGS. 22A and 22B. By dragging the page leftward, the display area of the touch screen 210 is moved horizontally from the area (symbol 310) bounded by broken lines to the area (symbol 314) bounded by solid lines. Since scroll is locked in the Y-direction, the display area is not moved in the Y-axis direction. This allows the user to scroll the web page 300 only in the horizontal direction to display a desired area on the screen without frustration.

Figure 23A:
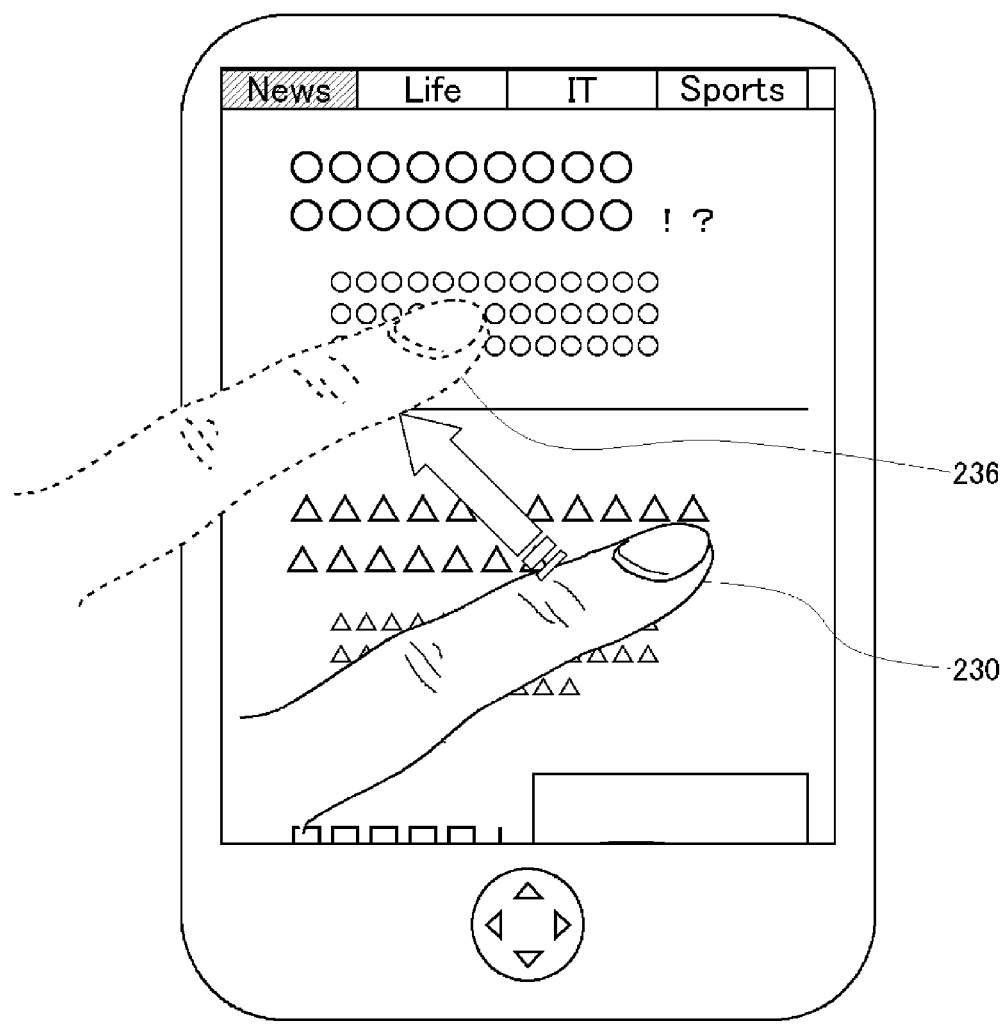
FIG. 23A shows an example of two-dimensional scroll.
Figure 23B:
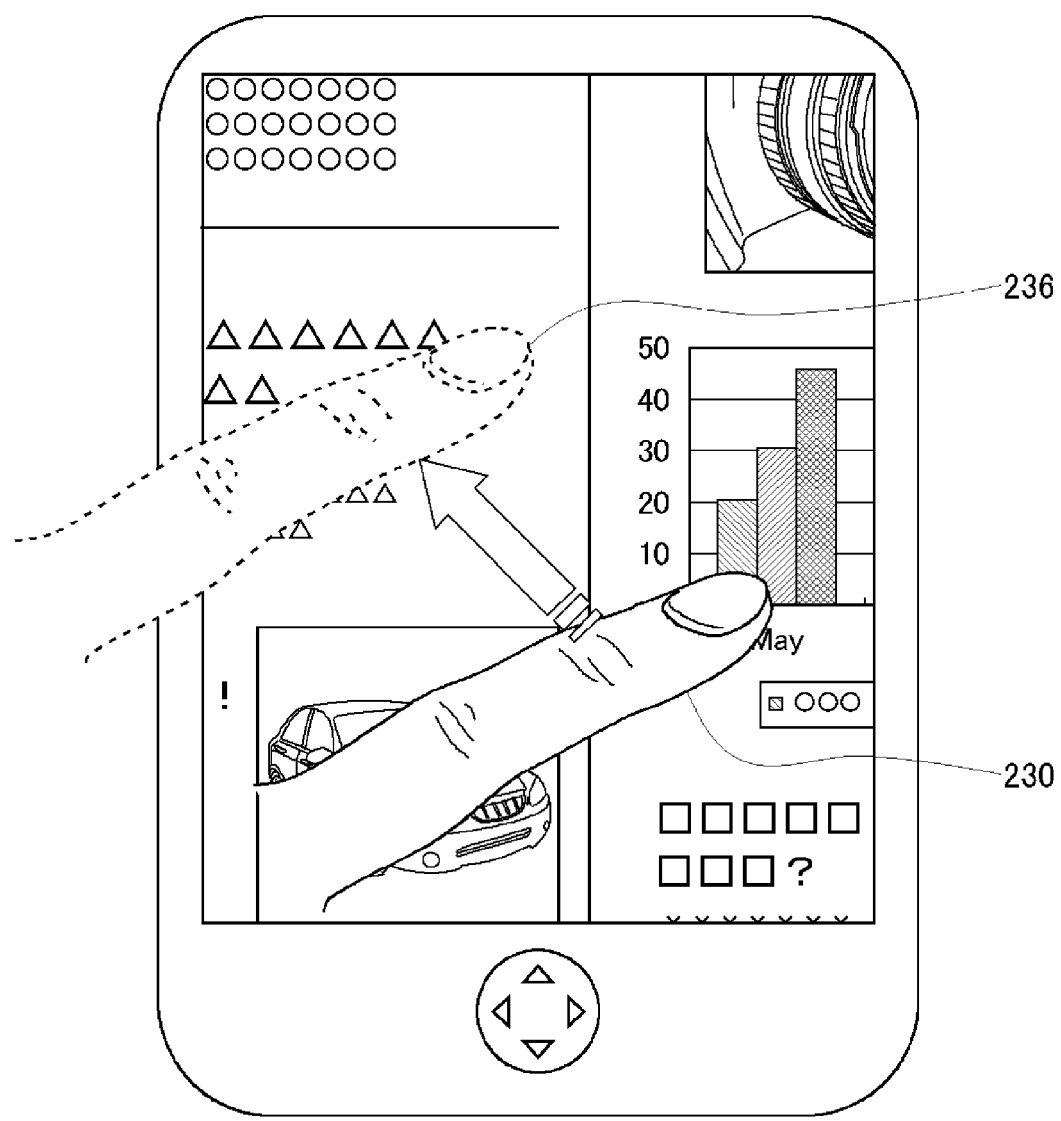
FIG. 23B shows an example of two-dimensional scroll.

FIGS. 23A and 23B show examples of two-dimensional scroll. FIG. 23A shows the top left area of the web page 300 on the touch screen 210 of the mobile terminal 200. The user attempts to scroll the web page 300 two-dimensionally by dragging the finger in contact with the touch screen 210 toward top left from a position indicated by the symbol 230 to a position indicated by a symbol 236. When the X-coordinate value of the touch point with reference to the point of origin defined at the starting point where the drag of the finger 230 toward top left starts exceeds the threshold value Thx for scroll lock in the X-direction and when the Y-coordinate value exceeds the threshold value Thy for scroll lock in the Y-direction, scroll is unlocked in the X-direction and the Y-direction so that the page is scrolled two-dimensionally. FIG. 23B shows the result of two-dimensional scroll. The finger is moved to a position indicated by the symbol 236. The web page 300 is scrolled toward top left so that a part of the bottom right area of the web page 300 begins to be viewable. As the user repeats dragging toward top left, the bottom right area of the web page 300 becomes viewable.

Figure 23C:
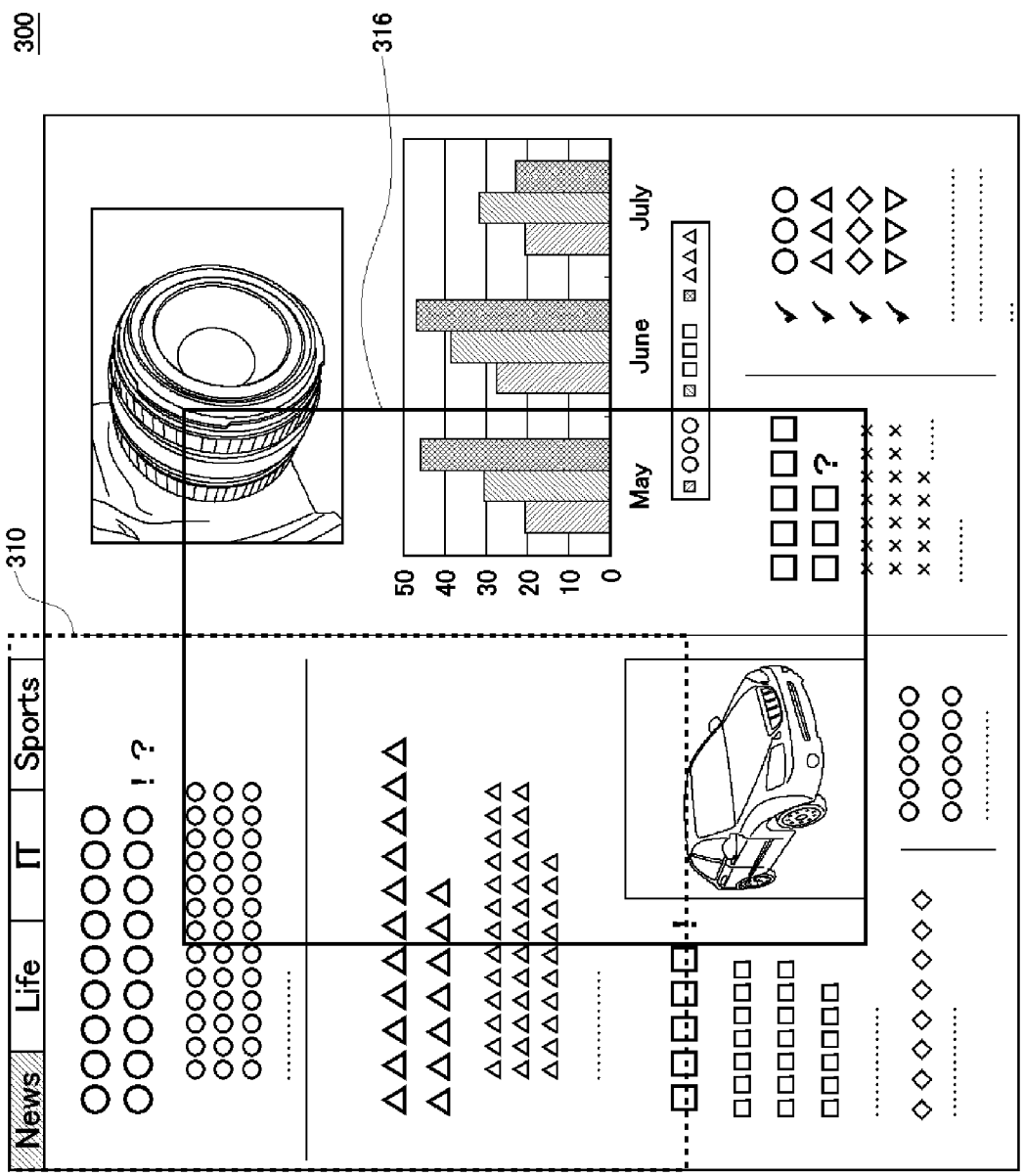
FIG. 23C shows how the display area of the touch screen is moved on the web page as a result of the two-dimensional scroll.

FIG. 23C shows how the display area of the touch screen 210 is moved on the web page 300 as a result of the two-dimensional scroll shown in FIGS. 23A and 23B. By dragging the page toward top left, the display area of the touch screen 210 is moved toward bottom right from the area (symbol 310) bounded by broken lines to the area (symbol 316) bounded by solid lines. This allows the user to scroll the web page 300 in any desired two-dimensional direction to display a desired area on the screen.

As described above, according to the scroll control device 100 of the embodiment, threshold values are defined in the X-direction and the Y-direction. Scroll is locked in the respective directions while the current coordinate values in the respective directions resulting from a drag operation do not exceed the respective threshold values. When a movement of a touch position resulting from a drag operation that exceeds a threshold value is detected in either direction, scroll lock in the direction is released. The screen is scrolled horizontally, vertically, or two-dimensionally depending on the state of release of scroll lock in each direction. This permits screen scroll in accordance with the user's drag operation. Smooth scroll operation that is less stressful and intuitively understood can be achieved.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The embodiments described in the items below are also encompassed by the present invention.

[Item 1] A scroll control device comprising a control unit configured to control horizontal scrolling and/or vertical scrolling on a screen in accordance with a comparison result, obtained by comparing between horizontal or vertical predetermined threshold values and a horizontal coordinate value or a vertical coordinate value, respectively, with reference to a point of origin defined at a touch-start point at which a drag operation on a touch screen starts.

[Item 2] The scroll control device according to item 1, further comprising: a judgment unit configured to lock horizontal scrolling in the horizontal direction when the horizontal coordinate value of the current touch point is less than the predetermined horizontal threshold value, and to lock vertical scrolling in the vertical direction when the vertical coordinate value of the current touch point is less than the predetermined vertical threshold value; and a determination unit configured to determine direction of scrolling the screen in accordance with whether horizontal scrolling is locked and whether vertical scrolling is locked, wherein the control unit scrolls the screen in the determined direction(s) of scrolling.

[Item 3] The scroll control device according to item 2, wherein, when horizontal scrolling in the horizontal direction and vertical scrolling in the vertical direction are both locked, the determination unit does not scroll the screen.

[Item 4] The scroll control device according to item 2 or 3, wherein, when horizontal scrolling in the horizontal direction is not locked and when vertical scrolling in the vertical direction is locked, the determination unit determines that the screen should not be scrolled in the vertical direction but should be scrolled in the horizontal direction.

[Item 5] The scroll control device according to one of items 2 through 4, wherein, when vertical scrolling in the vertical direction is not locked and when horizontal scrolling in the horizontal direction is locked, the determination unit determines that the screen should not be scrolled in the horizontal direction but should be scrolled in the vertical direction.

[Item 6] The scroll control device according to one of items 2 through 5, wherein, when horizontal scrolling in the horizontal direction and vertical scrolling in the vertical direction are both not locked, the determination unit determines that the screen should be scrolled both in the horizontal and vertical directions, i.e., scrolled two-dimensionally.

[Item 7] The scroll control device according to one of items 2 through 6, further comprising a threshold value adjusting unit configured to adjust the predetermined horizontal or vertical threshold values, from a maximum predetermined threshold value to a minimum predetermined threshold value, during the drag operation, wherein the judgment unit judges whether to lock horizontal scrolling and whether to lock vertical scrolling using the respective predetermined horizontal or vertical threshold values adjusted by the threshold value adjusting unit.

[Item 8] The scroll control device according to one of items 1 through 7, wherein a ratio between the predetermined horizontal threshold value used for judgment of locking the horizontal scrolling and the predetermined vertical threshold value used for judgment of locking the vertical scrolling is defined according to the ratio between the touch screen's horizontal dimension and vertical dimension.

What is claimed is:

1. A scroll control device comprising:
    a control unit that restricts horizontal scrolling and/or vertical scrolling on a screen in accordance with a comparison result between one or more predetermined threshold values and at least a horizontal-coordinate value or a vertical-coordinate value of a current touch point with reference to a point of origin defined at a touch-start point at which a drag operation on a touch screen starts, wherein the control unit decreases, during the drag operation, one or more of the threshold values from a respective value higher than a respective default threshold value to a respective value lower than the respective default threshold value;
    a judgment unit that locks horizontal scrolling when the horizontal-coordinate value of the current touch point is less than one value among the predetermined threshold values, and locks vertical scrolling when the vertical-coordinate value of the current touch point is less than another value among the predetermined threshold values; and
    a determination unit that determines direction of scrolling the screen in accordance with whether horizontal scrolling is locked and whether vertical scrolling is locked;
    wherein the control unit scrolls the screen in the determined direction of scrolling.

2. The scroll control device according to claim 1, further comprising:
    a movement amount acquisition unit that acquires an amount of horizontal movement and an amount of vertical movement during the drag operation on the touch screen; and
    a movement amount reset unit that resets the amount of horizontal movement or the amount of vertical movement when the horizontal-coordinate value or the vertical-coordinate value of a current touch point is less than one value among the predetermined threshold values,
    wherein the control unit scrolls the screen in accordance with the amount of horizontal movement and the amount of vertical movement as processed by the movement amount reset unit.

3. The scroll control device according to claim 2, wherein the control unit scrolls the screen in a vector direction determined by the amount of horizontal movement and the amount of vertical movement as processed by the movement amount reset unit.

4. The scroll control device according to claim 2, wherein, when the amount of horizontal movement is not reset to zero by the movement amount reset unit and when the amount of vertical movement is reset to zero by the movement amount reset unit, the control unit does not scroll the screen vertically but scrolls the screen horizontally.

5. The scroll control device according to claim 2, wherein, when the amount of vertical movement is not reset to zero by the movement amount reset unit and when the amount of horizontal movement is reset to zero by the movement amount reset unit, the control unit does not scroll the screen horizontally but scrolls the screen vertically.

6. The scroll control device according to claim 2, wherein, when neither the amount of horizontal movement nor the amount of vertical movement are reset to zero by the movement amount reset unit, the control unit scrolls the screen both horizontally and vertically.

7. The scroll control device according to claim 2, further comprising:
    a threshold value adjusting unit that adjusts the predetermined threshold values, from a maximum predetermined threshold value to a minimum predetermined threshold value, during the drag operation,
    the movement amount reset unit resets the amount of horizontal movement to zero during the drag operation when the horizontal-coordinate value of the current touch point is less than a value among the predetermined threshold values adjusted by the threshold value adjusting unit, and resets the amount of vertical movement to zero during the drag operation when the vertical-coordinate value of the current touch point is less than another value among the predetermined threshold values adjusted by the threshold value adjusting unit.

8. The scroll control device according to claim 1, wherein a ratio between the predetermined threshold value used for judgment as to whether an amount of horizontal movement should be reset and the predetermined threshold value used for judgment as to whether an amount of vertical movement should be reset is defined according to a ratio between a horizontal dimension of the touch screen and a vertical dimension of the touch screen.

9. A scrolling control method comprising:
    restricting horizontal scrolling or vertical scrolling according to a comparison result between one or more predetermined threshold values and at least a horizontal-coordinate value or a vertical-coordinate value of a current touch point with reference to a point of origin defined at a touch-start point at which a drag operation on the touch screen starts, and decreasing one or more of the threshold values from a respective value higher than a respective default threshold value to a respective value lower than the respective default threshold value.

10. A terminal device that scrolls and displays a screen by a drag operation on a touch screen, comprising:
   a display unit that scrolls and displays the screen such that horizontal scrolling or vertical scrolling of the screen may be locked according to a comparison result between one or more predetermined threshold values and at least a horizontal-coordinate value or a vertical-coordinate value of a current touch point with reference to a point of origin defined at a touch-start point at which the drag operation on the touch screen starts, wherein, during the drag operation, one or more of the threshold values are decreased from a respective value higher than a respective default threshold value to a respective value lower than the respective default threshold value;
   a judgment unit that locks horizontal scrolling when the horizontal-coordinate value of the current touch point is less than one value among the predetermined threshold values, and locks vertical scrolling when the vertical-coordinate value of the current touch point is less than another value among the predetermined threshold values; and
   a determination unit that determines direction of scrolling the screen in accordance with whether horizontal scrolling is locked and whether vertical scrolling is locked;
   wherein the display unit scrolls the screen in the determined direction of scrolling.

11. The scroll control method according to claim 9, further comprising:
   locking horizontal scrolling when the horizontal-coordinate value of the current touch point is less than one value among the predetermined threshold values, and locking vertical scrolling when the vertical-coordinate value of the current touch point is less than another value among the predetermined threshold values; and
   determining direction of scrolling the screen in accordance with whether horizontal scrolling is locked and whether vertical scrolling is locked,
   wherein the control unit scrolls the screen in the determined direction of scrolling.

12. A computer program embedded on a non-transitory computer-readable recording medium executed by a processor, comprising:
   a module that makes a comparison between one or more predetermined threshold values and at least a horizontal-coordinate value or a vertical-coordinate value with reference to a point of origin defined at a touch-start point at which a drag operation on a touch screen starts;
   a module that restricts horizontal scrolling or vertical scrolling of the screen according to the comparison, by decreasing, during the drag operation, one or more of the threshold values from a respective value higher than a respective default threshold value to a respective value lower than the respective default threshold value;
   a module that locks horizontal scrolling when the horizontal-coordinate value is less than one value among the predetermined threshold values, and locks vertical scrolling when the vertical-coordinate value is less than another value among the predetermined threshold values; and
   a module that determines direction of scrolling the screen in accordance with whether horizontal scrolling is locked and whether vertical scrolling is locked;
   wherein the module that restricts scrolls the screen in the determined direction of scrolling.

13. A computer program embedded on a non-transitory computer-readable recording medium executed by a processor, comprising:
   a module that determines, on a touch screen, a screen segment that a current touch point is located with reference to a point of origin defined at a touch-start point at which a drag operation on the touch screen starts, the screen segment defined by a predetermined horizontal threshold value and a predetermined vertical threshold value around the touch-start point at which the drag operation on a touch screen starts;
   a module that restricts vertical scrolling and/or horizontal scrolling of the screen according to the determination, by decreasing, during the drag operation, one or more of the threshold values from a respective value higher than a respective default threshold value to a respective value lower than the respective default threshold value;
   a module that locks horizontal scrolling when the horizontal-coordinate value is less than the predetermined horizontal threshold value, and locks vertical scrolling when the vertical-coordinate value is less than the predetermined vertical threshold value; and
   a module that determines direction of scrolling the screen in accordance with whether horizontal scrolling is locked and whether vertical scrolling is locked;
   wherein the module that restricts scrolls the screen in the determined direction of scrolling.

14. The scroll control method according to claim 9, wherein a ratio between the predetermined threshold value used for judgment as to whether an amount of horizontal movement should be reset and the predetermined threshold value used for judgment as to whether an amount of vertical movement should be reset is defined according to a ratio between a horizontal dimension of the touch screen and a vertical dimension of the touch screen.

15. The scroll control method according to claim 9, further comprising:
   acquiring an amount of horizontal movement and an amount of vertical movement during the drag operation on the touch screen; and
   resetting the amount of horizontal movement or the amount of vertical movement when the horizontal-coordinate value or the vertical-coordinate value of a current touch point is less than one value among the predetermined threshold values,
   wherein the scrolling of the screen is in accordance with the amount of horizontal movement and the amount of vertical movement as processed by the movement amount reset unit.

16. The scroll control method according to claim 15, wherein the scrolling of the screen is in a vector direction determined by the amount of horizontal movement and the amount of vertical movement as processed by the movement amount reset unit.

17. The scroll control method according to claim 15, wherein, when the amount of horizontal movement is not reset to zero by the movement amount reset unit and when the amount of vertical movement is reset to zero by the movement amount reset unit, the screen is not vertically scrolled but is horizontally scrolled.

18. The scroll control method according to claim 15, wherein, when the amount of vertical movement is not reset to zero by the movement amount reset unit and when the amount of horizontal movement is reset to zero by the movement amount reset unit, the the screen is not scrolled horizontally but is scrolled vertically.

19. The scroll control method according to claim 15, wherein, when neither the amount of horizontal movement nor the amount of vertical movement are reset to zero by the movement amount reset unit, the screen is scrolled both horizontally and vertically.

20. The scroll control method according to claim 15, further comprising:
   adjusting the predetermined threshold values, from a maximum predetermined threshold value to a minimum predetermined threshold value, during the drag operation,
   resetting the amount of horizontal movement to zero during the drag operation when the horizontal-coordinate value of the current touch point is less than a value among the predetermined threshold values adjusted by the threshold value adjusting unit, and resetting the amount of vertical movement to zero during the drag operation when the vertical-coordinate value of the current touch point is less than another value among the predetermined threshold values adjusted by the threshold value adjusting unit.

* * * * *